United States Patent
Kamei et al.

(10) Patent No.: US 11,070,986 B2
(45) Date of Patent: Jul. 20, 2021

(54) COMMUNICATION PROCESSING SYSTEM, METHOD, APPARATUS AND CONTROL PROGRAM, FOR OPTIMIZING POWER CONSUMPTION

(71) Applicant: NEC CORPORATION, Tokyo (JP)

(72) Inventors: Akira Kamei, Tokyo (JP); Yumiko Okuyama, Tokyo (JP); Toru Yamada, Tokyo (JP); Kyoji Hirata, Tokyo (JP); Masahiro Serizawa, Tokyo (JP); Masashi Shimoma, Tokyo (JP); Satoshi Hasegawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 68 days.

(21) Appl. No.: 16/482,922

(22) PCT Filed: Dec. 11, 2017

(86) PCT No.: PCT/JP2017/044451
§ 371 (c)(1),
(2) Date: Aug. 1, 2019

(87) PCT Pub. No.: WO2018/142773
PCT Pub. Date: Aug. 9, 2018

(65) Prior Publication Data
US 2019/0364437 A1    Nov. 28, 2019

(30) Foreign Application Priority Data
Feb. 3, 2017   (JP) .............................. JP2017-018828

(51) Int. Cl.
*H04B 7/00*    (2006.01)
*H04W 16/26*    (2009.01)
(Continued)

(52) U.S. Cl.
CPC .......... *H04W 16/26* (2013.01); *H04W 24/02* (2013.01); *H04W 48/16* (2013.01); *H04W 48/20* (2013.01); *H04W 88/06* (2013.01)

(58) Field of Classification Search
CPC ..... H04W 40/02; H04W 40/04; H04W 40/10; H04W 40/20; H04W 40/246
(Continued)

(56) References Cited

U.S. PATENT DOCUMENTS 7,702,280 B2 * 4/2010 Takeda .................. H04L 45/122
                                                              455/7
8,331,267 B2 * 12/2012 Zhang .................... H04W 24/02
                                                              370/256

(Continued)

FOREIGN PATENT DOCUMENTS

| JP | 2011-029851 A | 2/2011 |
| JP | 2012506192 A | 3/2012 |
| JP | 2016-111619 A | 6/2016 |

OTHER PUBLICATIONS

"3rd Generation Partnership Project; Technical Specification Group Services and System Aspects; Proximity-based services (ProSe); Stage 2 (Release 14)", 3GPP TS 23.303 V14.1.0, Dec. 2016, 15 pages.

(Continued)

*Primary Examiner* — Dmitry Levitan
(74) *Attorney, Agent, or Firm* — Sughrue Mion, PLLC

(57) ABSTRACT

This invention provides a communication processing system that appropriately manages total power consumption in a cell managed by a base station. The communication processing system includes a communication terminal, a base station, a plurality of relay stations that relay communication between the communication terminal and the base station, first measurers in the plurality of relay stations that measure strengths of first signals received from the base station, a
(Continued)

second measurer in the communication terminal that measures strengths of second signals received from the plurality of relay stations, and selects a communication path with a smallest difference between strengths of a first signal a second signal in a plurality of communication paths on which the base station, the plurality of relay stations and the communication terminal are connected.

10 Claims, 20 Drawing Sheets

(51) Int. Cl.
*H04W 24/02* (2009.01)
*H04W 48/16* (2009.01)
*H04W 48/20* (2009.01)
*H04W 88/06* (2009.01)

(58) Field of Classification Search
USPC .................................. 370/310, 315, 322, 327
See application file for complete search history.

(56) References Cited

U.S. PATENT DOCUMENTS

| | | | | |
|---|---|---|---|---|
| 9,072,000 B2* | 6/2015 | Tavildar | ................ | H04W 24/10 |
| 9,713,072 B2* | 7/2017 | Liao | ..................... | H04W 48/14 |
| 10,349,294 B2* | 7/2019 | Kim | ...................... | H04W 84/08 |
| 10,531,365 B2* | 1/2020 | Kaur | ..................... | H04W 24/04 |
| 10,602,568 B2* | 3/2020 | Jung | ..................... | H04W 92/18 |
| 2019/0364437 A1* | 11/2019 | Kamei | ................. | H04W 88/04 |

OTHER PUBLICATIONS

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 13)", 3GPP TS 36.300, V13.6.0, Dec. 2016, 20 pages.

International Search Report for PCT/JP2017/044451, dated Jan. 16, 2018.

Communication dated Jul. 14, 2020 from the Japanese Patent Office in Application No. 2018-565974.

* cited by examiner

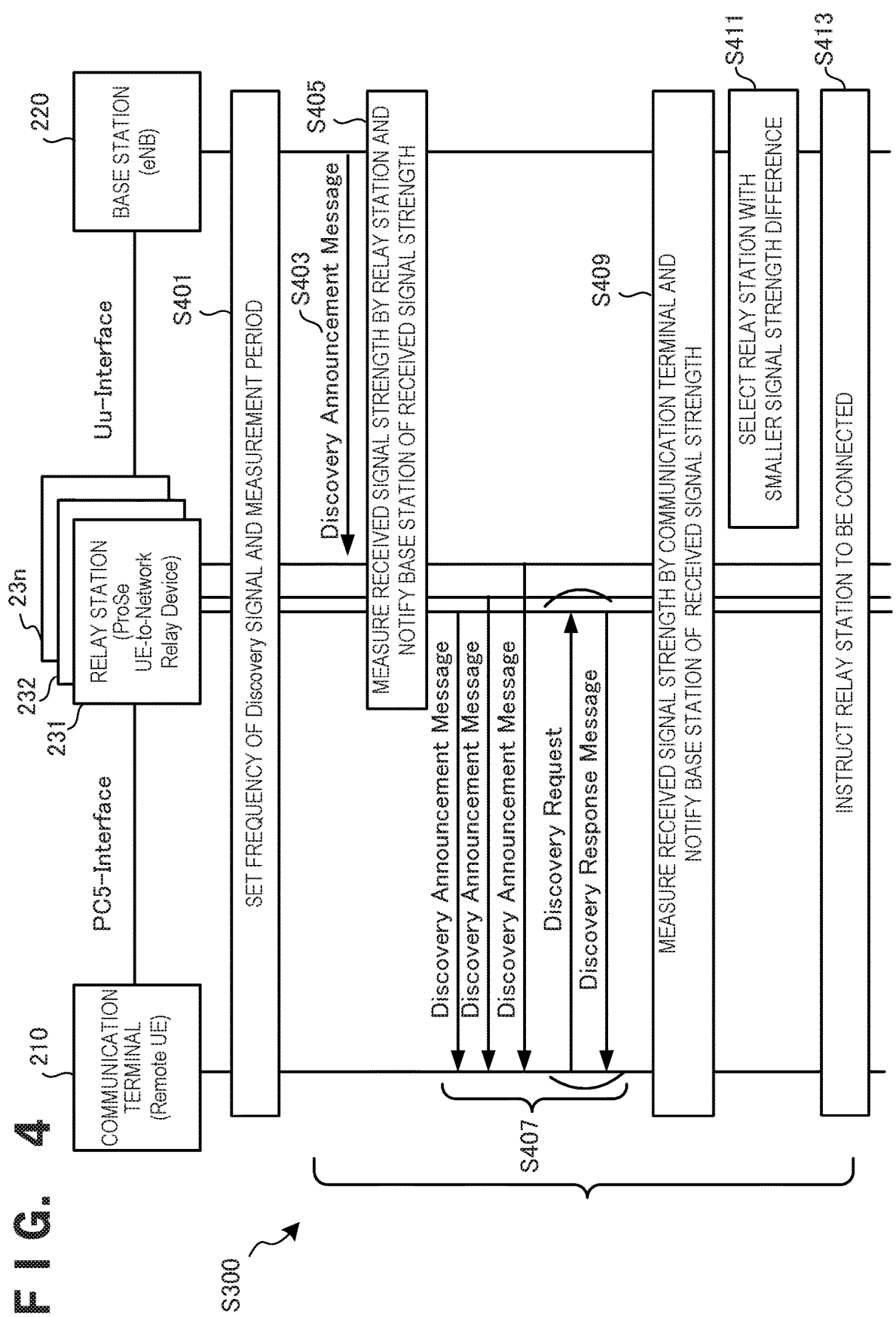

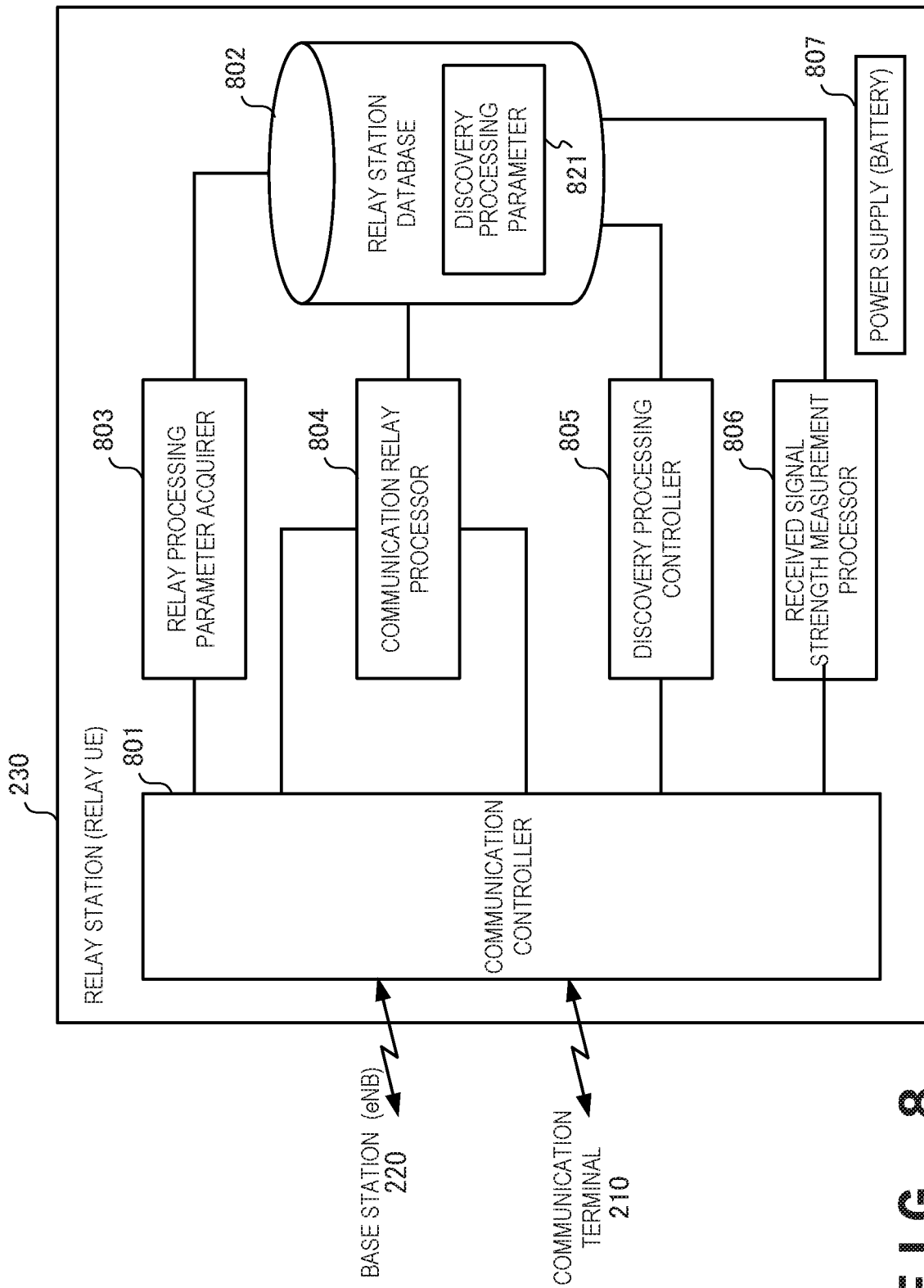
F I G. 8

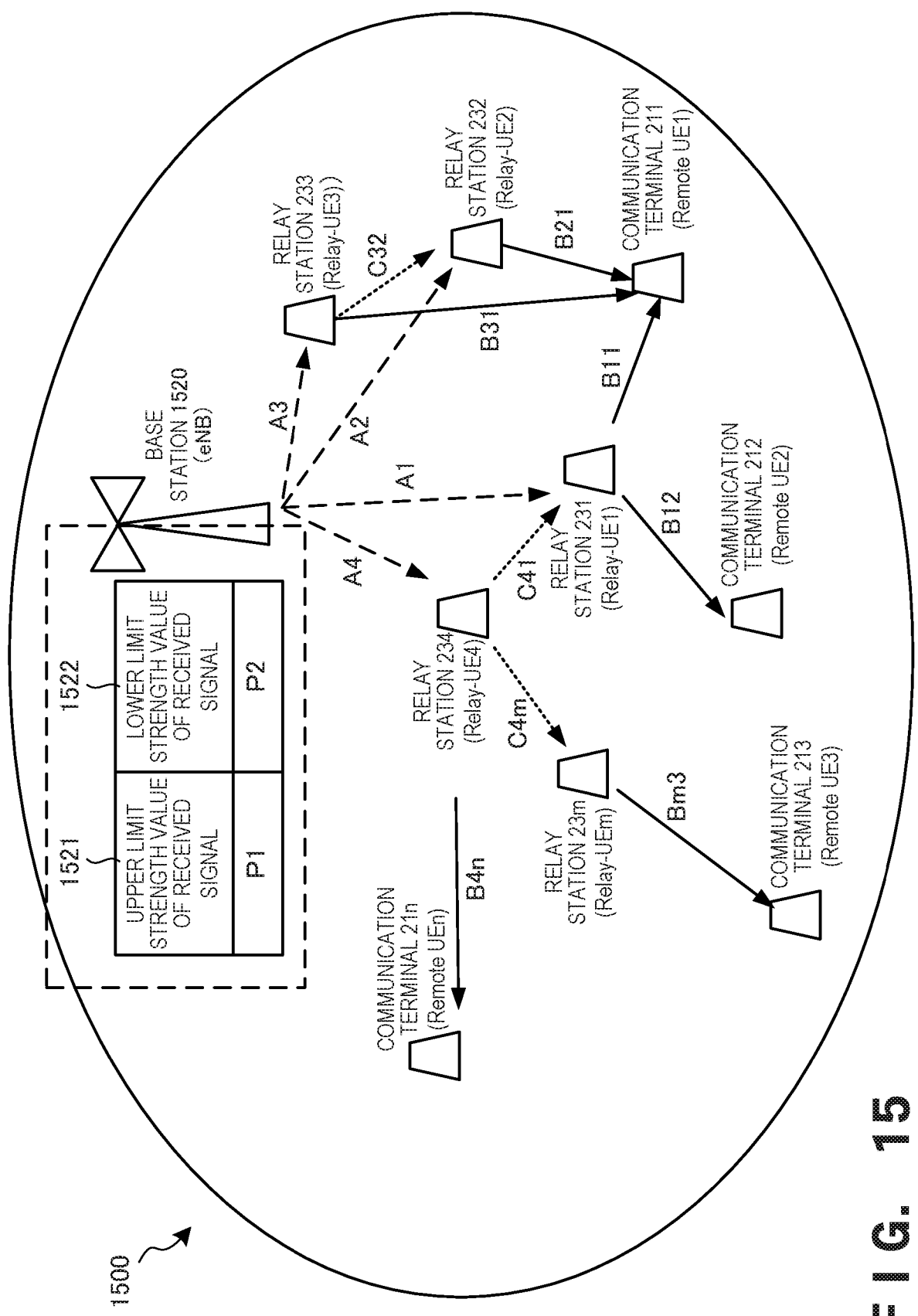
F I G. 15

| 221 | 222 | 223 | 1224 | 1225 | RELAY STATION LIMITATION INFORMATION ||| 1927 |
|---|---|---|---|---|---|---|---|---|
| RELAY STATION | STRENGTH OF FIRST RECEIVED SIGNAL | STRENGTH OF SECOND RECEIVED SIGNAL | STRENGTH OF THIRD RECEIVED SIGNAL | STRENGTH DIFFERENCE | NUMBER OF COMMUNICATIONS THAT RELAY STATION CAN RELAY | NUMBER OF RELAYING COMMUNICATIONS 1926 | REMAINING BATTERY LEVEL | SELECTION |
| | | | | | | | ... | |
| Relay-UE1 | A1 | B1 | (C12, C13) | | | | | |
| Relay-UE2 | A2 | B2 | C32 | | | | | |
| Relay-UE3 | A3 | B3 | C23 | | | | | |
| ... | | | | | | | | |
| Relay-UEm | Am | Bm | Cxm | | | | | |

F I G. 19

COMMUNICATION PROCESSING SYSTEM, METHOD, APPARATUS AND CONTROL PROGRAM, FOR OPTIMIZING POWER CONSUMPTION

CROSS REFERENCE TO RELATED APPLICATIONS

This application is a National Stage of International Application No. PCT/JP2017/044451 filed Dec. 11, 2017, claiming priority based on Japanese patent application No. 2017-018828, filed on Feb. 3, 2017, the disclosure of which is incorporated herein in its entirety by reference.

TECHNICAL FIELD

The present invention relates to a communication processing system, a communication processing method, a communication processing apparatus, and a control method and a control program thereof.

BACKGROUND ART

Currently, the 3GPP is examining a method of transmitting data from a remote device (remote UE: Remote User Equipment) to a base station via a relay device (relay UE: Relay User Equipment/UE-to-Network Relay device), and methods are disclosed in non-patent literatures 1 and 2.

In non-patent literature 1, an architecture model is described in "4.4.3 ProSe UE-to-Network Relay for Public Safety", and a procedure of establishing ProSe (D2D) connection via UE-to-Network Relay is described in Figure 5.4.4.1-1 in "5.4.4 Direct communication via ProSe UE-to-Network Relay". The explanation of Figure 5.4.4.1-1 includes an account saying "even after the connection using the relay UE, to reselect a relay UE, the remote UE continuously measures the signal strength of the discovery message sent from the relay UE" (see non-patent literature 1, p. 102, lines 14-21).

Additionally, "23.10.4 Sidelink Communication via ProSe UE-to-Network Relay" in non-patent literature 2 writes that "whether a UE can operate as a relay UE is controlled by a base station" and that "a remote UE selects a relay UE of the highest PC5 link quality, and if the signal strength of the PC5 link is less than a preset threshold, a relay UE reselection process is performed" (see non-patent literature 2, p. 283, lines 1-8).

In the above technical field, patent literature 1 discloses a technique of selecting a nearby relay station based on received signal strengths from relay stations, which are measured by a communication terminal, and connecting the relay station to a base station.

CITATION LIST

Patent Literature

Patent literature 1: Japanese Patent Laid-Open No. 2011-02985-Non-Patent Literature
Non-patent literature 1: 3GPP TS 23.303 V14.1.0 (2016-12) Proximity-based service (ProSe)
Non-patent literature 2: 3GPP TS 36.300 V13.6.0 (2016-12) E-UTRAN Overall description

SUMMARY OF THE INVENTION

Technical Problem

However, in the techniques described in the above literatures, if the remote UE selects the relay UE candidate of the highest strength of received signal as the relay UE for itself, the transmission power of the remote UE is suppressed, but conversely, it may be necessary to increase the transmission power of the relay UE. That is, the total power consumption in the cell managed by the base station is not optimized.

The present invention enables to provide a technique of solving the above-described problem.

Solution to Problem

One example aspect of the present invention provides a communication processing system comprising:
a communication terminal;
a base station;
a plurality of relay stations that relay communication between the communication terminal and the base station;
first measurers in the plurality of relay stations that measure strengths of first signals received from the base station;
a second measurer in the communication terminal that measures strengths of second signals received from the plurality of relay stations; and
a selector that compares the strengths of the first signals and the strengths of the second signals, and selects a communication path with a smallest difference between strengths of a first signal and a second signal in a plurality of communication paths on which the base station, the plurality of relay stations and the communication terminal are connected.

Another example aspect of the present invention provides a communication processing method of a communication processing system including a communication terminal, a base station, and a plurality of relay stations that relay communication between the communication terminal and the base station, comprising:
measuring, in the plurality of relay stations, strengths of first signals received from the base station;
measuring, in the communication terminal, strengths of second signals received from the plurality of relay stations; and
comparing the strengths of the first signals and the strengths of the second signals, and selecting a communication path with a smallest difference between strengths of a first signal and a second signal in a plurality of communication paths on which the base station, the plurality of relay stations and the communication terminal are connected.

Still other example aspect of the present invention provides a communication processing apparatus comprising:
a first receiver that receives, from a plurality of relay stations that relay communication between a communication terminal and a base station, strengths of first signals which are measured, in the plurality of relay stations, based on the first signals received from the base station;
a second receiver that receives, from the communication terminal, strengths of second signals which are measured, in the communication terminal, based on the second signals received from the plurality of relay stations; and
a selector that compares the strengths of the first signals and the strengths of the second signals, and selects a communication path with a smallest difference between strengths of a first signal and a second signal in a plurality of communication paths on which the base station, the plurality of relay stations and the communication terminal are connected.

Still other example aspect of the present invention provides a control method of a communication processing apparatus, comprising:

receiving, from a plurality of relay stations that relay communication between a communication terminal and a base station, strengths of first signals which are measured, in the plurality of relay stations, based on the first signals received from the base station;

receiving, from the communication terminal, strengths of second signals which are measured, in the communication terminal, based on the second signals received from the plurality of relay stations; and comparing the strengths of the first signals and the strengths of the second signals, and selecting a communication path with a smallest difference between strengths of a first signal and a second signal in a plurality of communication paths on which the base station, the plurality of relay stations and the communication terminal are connected.

Still other example aspect of the present invention provides a communication processing apparatus control program for causing a computer to execute a method, comprising:

receiving, from a plurality of relay stations that relay communication between a communication terminal and a base station, strengths of first signals which are measured, in the plurality of relay stations, based on the first signals received from the base station;

receiving, from the communication terminal, strengths of second signals which are measured, in the communication terminal, based on the second signals received from the plurality of relay stations; and comparing the strengths of the first signals and the strengths of the second signals, and selecting a communication path with a smallest difference between strengths of a first signal and a second signal in a plurality of communication paths on which the base station, the plurality of relay stations and the communication terminal are connected.

Advantageous Effects of Invention

According to the present invention, it is possible to appropriately manage the total power consumption in the cell managed by the base station.

BRIEF DESCRIPTION OF DRAWINGS

FIG. 4 is a sequence chart showing the operation of the communication processing system according to the second example embodiment of the present invention;

FIG. 8 is a block diagram showing the functional arrangement of a relay station (relay UE) according to the second example embodiment of the present invention;

FIG. 15 is a view showing the arrangement of a communication processing system according to the fourth example embodiment of the present invention;

FIG. 19 is a view showing relay station limitation information according to the fifth example embodiment of the present invention.

DESCRIPTION OF EXAMPLE EMBODIMENTS

Example embodiments of the present invention will now be described in detail with reference to the drawings. It should be noted that the relative arrangement of the components, the numerical expressions and numerical values set forth in these example embodiments do not limit the scope of the present invention unless it is specifically stated otherwise.

First Example Embodiment

A communication processing system 100 according to the first example embodiment of the present invention will be described with reference to FIG. 1. The communication processing system 100 is a system including a relay station.

Figure 1:
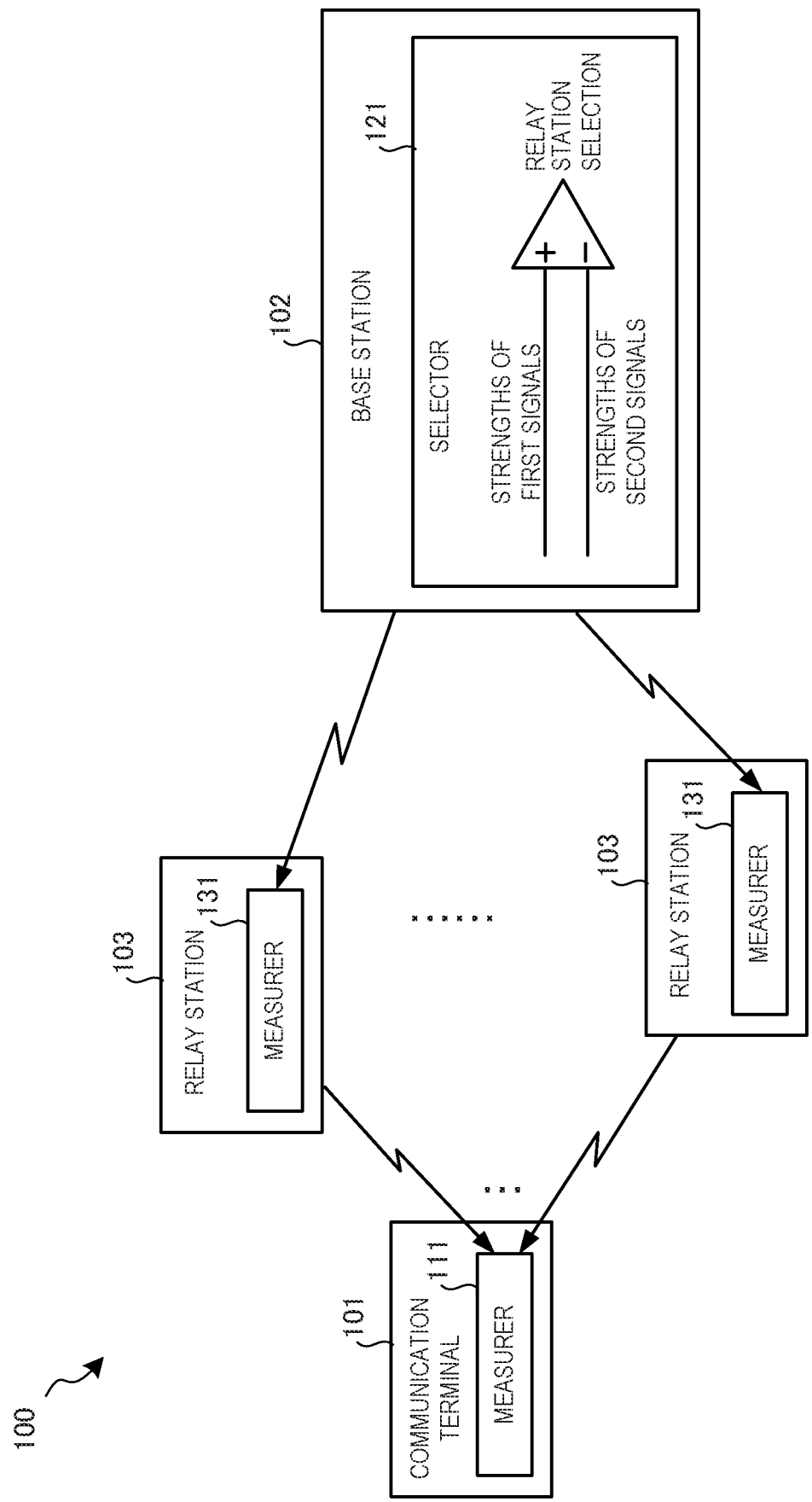
FIG. 1 is a block diagram showing the arrangement of a communication processing system according to the first example embodiment of the present invention.

As shown in FIG. 1, the communication processing system 100 includes a communication terminal 101, a base station 102, a plurality of relay stations 103, first measurers 131, a second measurer 111, and a selector 121. The plurality of relay stations 103 relay communication between the communication terminal 101 and the base station 102. The first measurers 131 in the plurality of the relay stations 103 measure strengths of first signals received from the base station 102. The second measurer 111 in the communication terminal 101 measures strengths of second signals received from the plurality of relay stations 103. The selector 121 compares the strengths of the first signals and the strengths of the second signals, and selects a communication path with a smallest difference between strength of a first signal and a second signal in a plurality of communication paths on which the base station 102, the plurality of relay stations 103 and the communication terminal 101 are connected.

According to this example embodiment, it is possible to appropriately manage the total power consumption in the cell managed by the base station by selecting the communication path with the smallest difference between signals.

Second Example Embodiment

A communication processing system according to the second example embodiment of the present invention will be described next. In the communication processing system according to this example embodiment, a strength of received signal from each relay station measured by a communication terminal is compared with a strength of received signal from a base station measured by each relay station, and a relay station of a smaller difference, which relays the communication terminal and the base station, is selected.

<<Outline of Arrangement of Communication Processing System>>

Figure 2:
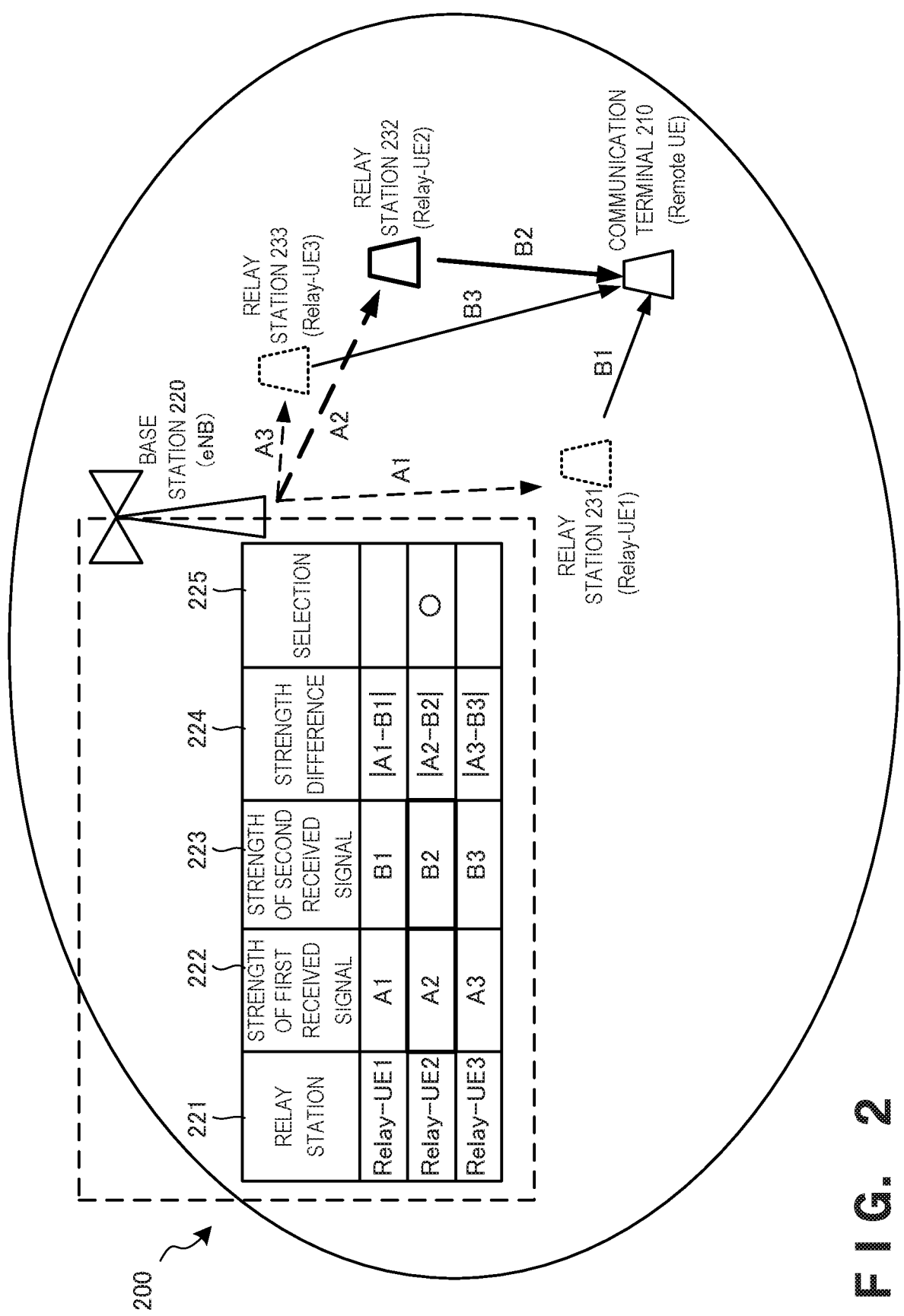
FIG. 2 is a view showing the arrangement of a communication processing system according to the second example embodiment of the present invention.

FIG. 2 is a view showing the arrangement of a communication processing system 200 according to this example embodiment. FIG. 2 shows the establishment of communication paths between a communication terminal 210 and a base station 220 via relay stations 231 to 233 in a cell managed by the base station 220.

In FIG. 2, A1 to A3 are the measurement results of strengths of signals received from the base station 220 measured in the relay stations 231 to 233. In addition, B1 to B3 are the measurement results of strengths of signals received from the relay stations 231 to 233 measured in the communication terminal 210.

In the base station 220, a strength of a first received signal 222 (A1 to A3) and a strength of a second received signal 223 (B1 to B3) are collected, and a difference 224 between the signal strengths is obtained in association with each relay station 221. The relay station (Relay-UE2) of the smallest signal strength difference 224 is selected as the relay station that relays the base station 220 and the communication terminal 210 (see 225). When the relay station (Relay-UE2) is used, it is possible to suppress the power consumption of the communication terminal 210 and also suppress the power consumption of a relay station 230. This can optimize the total power consumption of the entire communication processing system 200.

<<Technical Premise>>

A technical premise concerning the received signal strength measurement within the technical scope of this example embodiment will be described with reference to FIGS. 3A and 3B.

Figure 3A:
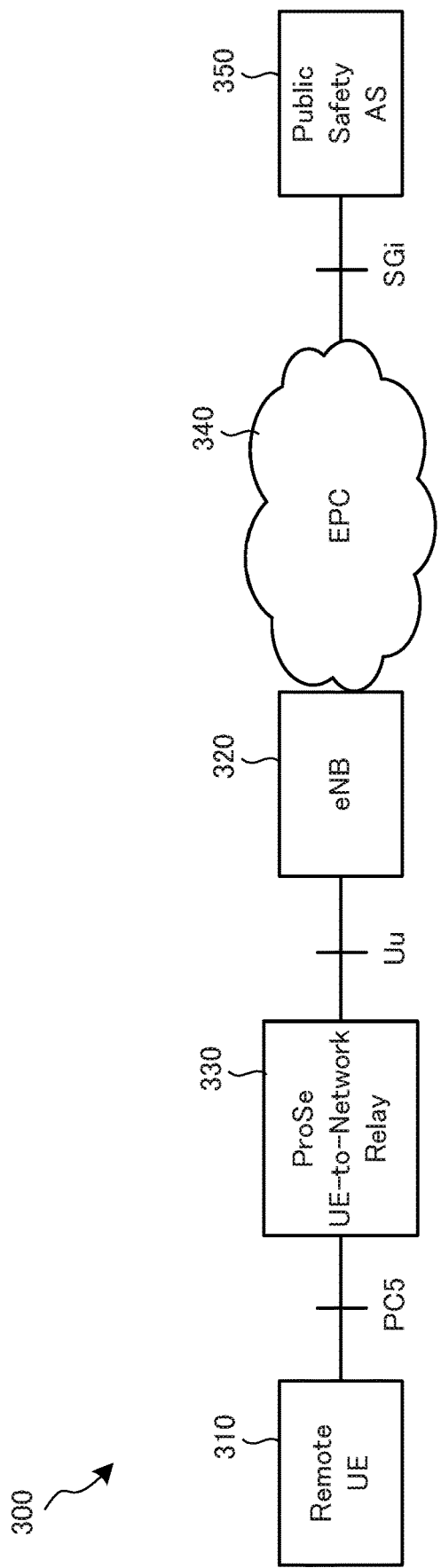
FIG. 3A is a block diagram showing the standard arrangement of a communication processing system according to a technical premise.

FIG. 3A is a block diagram showing the standard arrangement of a communication processing system 300 according to a technical premise. FIG. 3A shows the architecture model of the communication processing system 300 shown in Figure 4.4.3-1 of "4.4.3 ProSe UE-to-Network Relay for Public Safety" of non-patent literature 1. In addition, FIG. 3B is a sequence chart showing the standard operation of the communication processing system 300 according to the technical premise. FIG. 3B shows a procedure of establishing ProSe (D2D) connection via UE-to-Network Relay shown in Figure 5.4.4.1-1 of "5.4.4 Direct communication via ProSe UE-to-Network Relay" of non-patent literature 1.

The outline of the connection establishment procedure (S300) of UE-to-Network Relay will be described below based on Figure 5.4.4.1-1. 1. A UE-to-Network Relay node attaches to E-UTRAN to establish PDN connection. 2. A remote UE searches for a UE-to-Network Relay node using the Model-A or Model-B discovery procedure. 3. The remote UE selects the UE-to-Network Relay node and establishes connection. 4. The UE-to-Network Relay node sets the IP address of the remote UE. 5. The UE-to-Network Relay node reports the remote UE ID and IP information to MME. 6. The MME reports the user ID and the IP information to S-GW and P-GW. 7. Relay traffic is transmitted/received between the remote UE and the P-GW.

Figure 5:
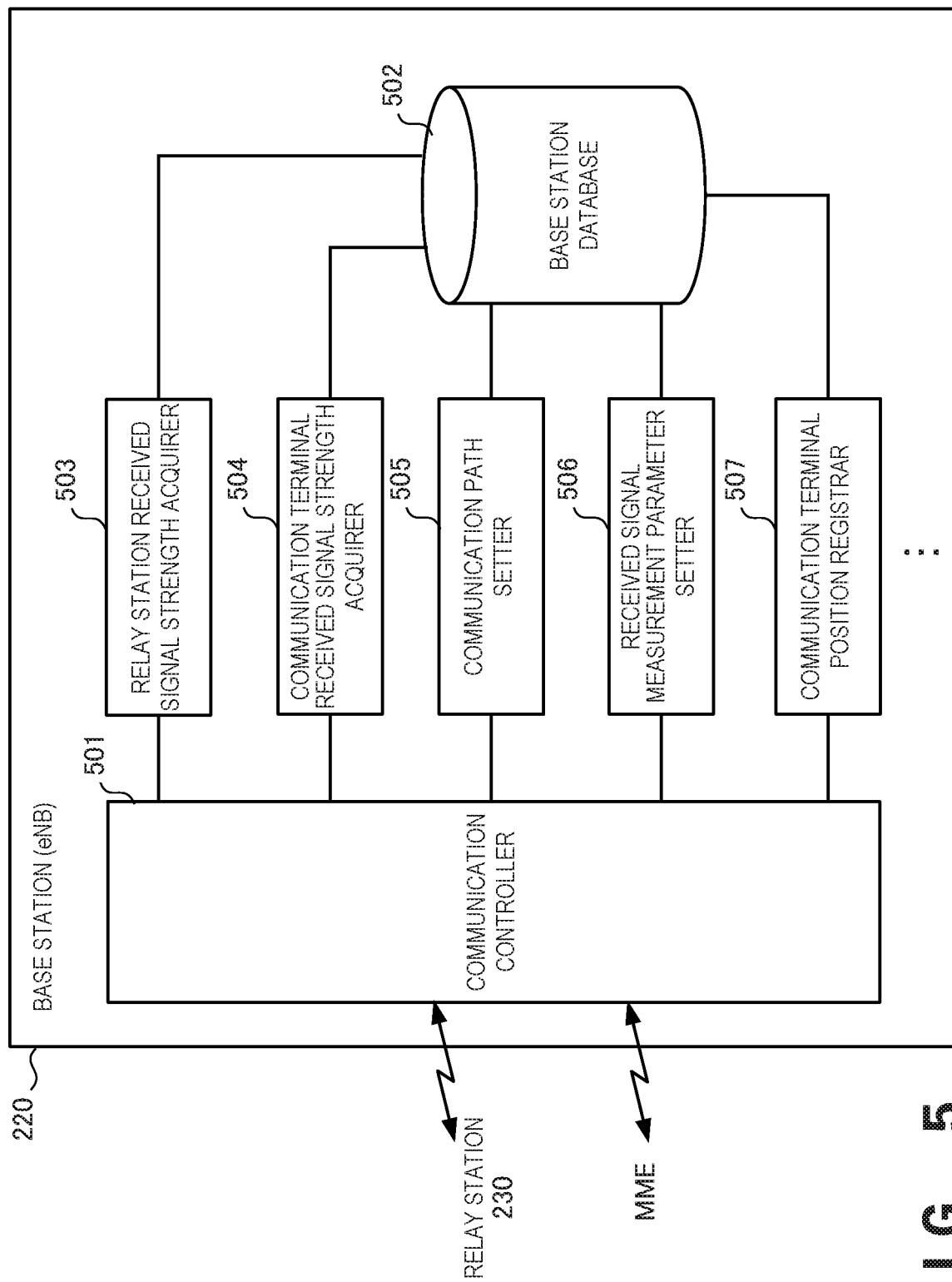
FIG. 5 is a block diagram showing the functional arrangement of a communication processing apparatus (base station: eNB) according to the second example embodiment of the present invention.

Note that the explanation of Figure 5.4.4.1-1 includes an account saying "even after the connection using the relay UE, to reselect a relay UE, the remote UE continuously measures the signal strength of the discovery message sent from the relay UE".

Additionally, "23.10.4 Sidelink Communication via ProSe UE-to-Network Relay" in non-patent literature 2 writes that "whether a UE can operate as a relay UE is controlled by a base station" and that "a remote UE selects a relay UE of the highest PC5 link quality, and if the signal strength of the PC5 link is less than a preset threshold, a relay UE reselection process is performed".

<<Problem of Technical Premise>>

Figure 3B:
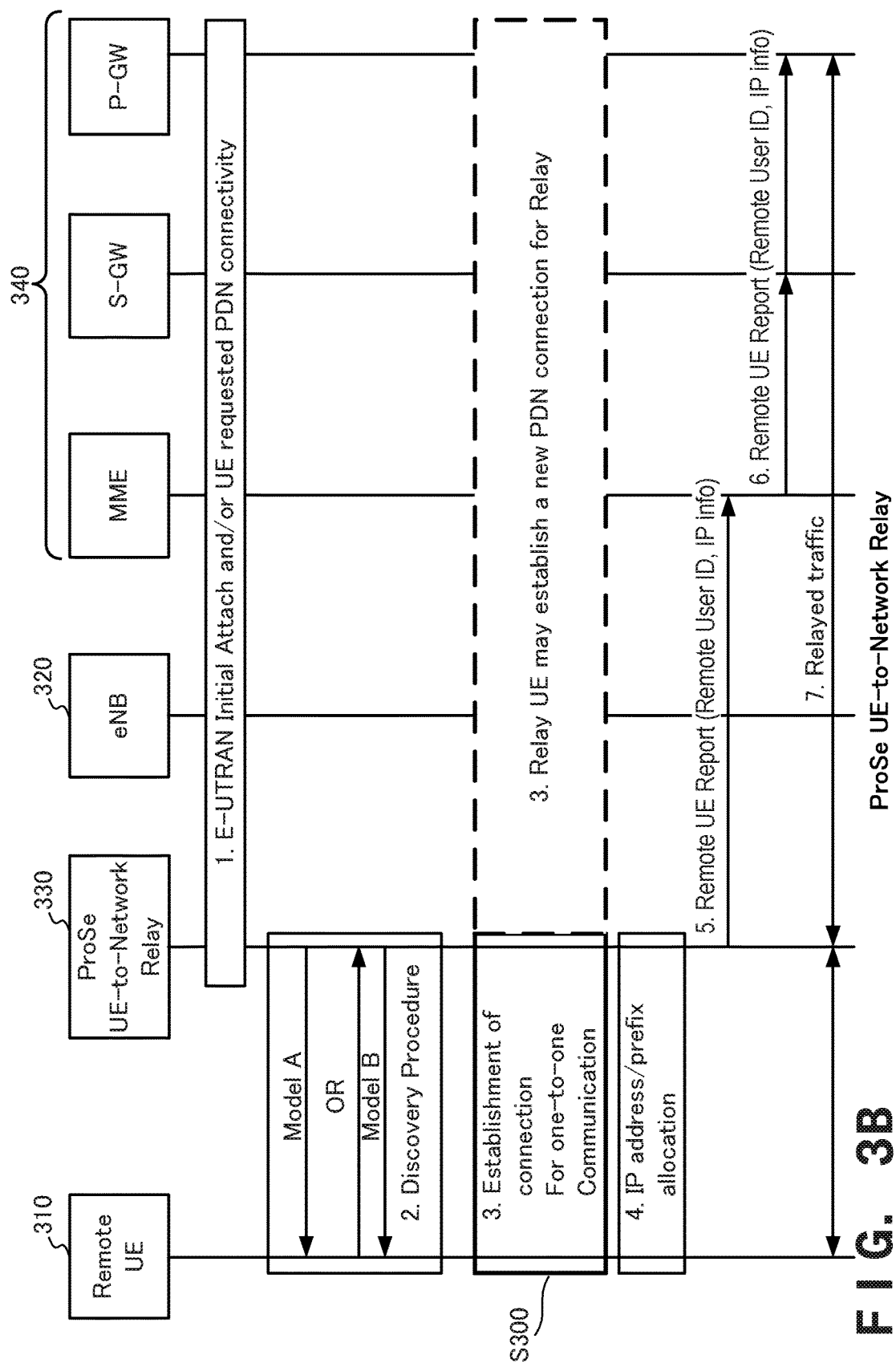
FIG. 3B is a sequence chart showing the standard operation of the communication processing system according to the technical premise.

Here, in step S300 of FIG. 3B, if there occurs necessity of selecting or reselecting a relay UE, the remote UE measures the received signal strengths of discovery announcement messages sent from a plurality of relay UE candidates, and selects the relay UE candidate of the highest link quality as the relay UE for itself. However, when the link quality between the remote UE and the relay UE is high, with a few exceptions (interference or reflection or blocking by a building), it is considered that the distance between them is also short in many cases. In addition, when the remote UE and the relay UE are close, it is supposed that the distance between the relay UE and the base station is reversely long. That is, if the remote UE selects the relay UE candidate of the highest strength of received signal as the relay UE for itself, the transmission power of the remote UE is suppressed, but conversely, it may be necessary to increase the transmission power of the relay UE. That is, the total power consumption in the cell managed by the base station is not optimized.

Technical Solution According to this Example Embodiment

In this example embodiment, to solve or alleviate the above-described problem, the base station acquires state information concerning the remote UE and the plurality of relay UE candidates, and causes the remote UE to select an optimum relay UE based on the information. Note that the remote UE according to this example embodiment includes an IoT (Internet of Things) device, an MTC (Machine Type Communication) device, an M2M (Machine to Machine) device, and the like.

<<Operation Sequence of Communication Processing System>>

FIG. 4 is a sequence chart showing the operation of the communication processing system 200 according to the second example embodiment of the present invention. FIG. 4 shows a sequence of selecting a relay station based on a new condition according to this example embodiment in step S300 of FIG. 3B.

In step S401, the base station 220 sets the frequency of a discovery signal and the measurement period in the relay stations 231 to 23n and the communication terminal 210. After that, the measurement of the strength of received signal is repeated in synchronism with the frequency and the measurement period.

In step S403, the base station 220 transmits a discovery signal whose signal strength is measured by the relay stations. In step S405, the base station 220 collects and stores the strength of received signal from each relay station, which is measured by each relay station.

In step S407, each of the relay stations 231 to 23n transmits a discovery signal whose signal strength is measured by the communication terminal 210. Note that in this example embodiment, a case of "Model A" in which a Discovery Announcement Message is periodically transmitted from the relay station 430 will be described. However, "Model B" in which the communication terminal 410 requests a Discovery Response Message may be used. Then, in step S409, the base station 220 collects and stores the strength of received signal via each relay station from the communication terminal 210, which is measured by the communication terminal 210.

In step S411, the base station 220 selects a relay station of a smaller signal strength difference based on the collected received signal strengths received by the relay stations and the communication terminal. In step S413, the base station 220 instructs, for the communication terminal 210, the relay station to be connected, thereby establishing the communication path.

<<Functional Arrangement of Communication Processing Apparatus>>

FIG. 5 is a block diagram showing the functional arrangement of the communication processing apparatus 220 (base station: eNB) according to this example embodiment. Note that FIG. 5 shows functional components associated with this example embodiment, and other functions provided in the communication processing apparatus 220 are not illustrated.

The communication processing apparatus 220 includes a communication controller 501, a base station database 502, a relay station received signal strength acquirer 503, a communication terminal received signal strength acquirer 504, a communication path setter 505, a received signal measurement parameter setter 506, and a communication terminal position registrar 507.

The communication controller 501 controls communication between the communication processing apparatus 220 and the relay station 230 or a host device such as an MME. Note that although not illustrated in FIG. 5, the communication controller 501 may control communication between the communication processing apparatus 220 and the communication terminal 210. Additionally, in FIG. 5, one communication controller 501 controls communication with both the subordinate device and the host device. However, a subordinate device communication controller and a host device communication controller may separately be provided.

The base station database 502 stores data necessary for the operation of the communication processing apparatus 220 serving as a base station. The relay station received signal strength acquirer 503 acquires the strength of received signal from the base station, which is measured by each relay station, from the relay station, and stores it in the base station database 502. The communication terminal received signal strength acquirer 504 acquires the strength of received signal from each relay station, which is measured by the communication terminal, from the communication terminal via the relay station, and stores it in the base station database 502. Based on communication history information including the measurement results of the received signal strengths stored in the base station database 502, the communication path setter 505 instructs to select and set the relay station 230 to be connected to the communication terminal 210. The received signal measurement parameter setter 506 refers to the base station database 502, and sets received signal measurement parameters in the communication terminal 210 or the relay station 230. The communication terminal position registrar 507 receives the position of the communication terminal 210 located in the cell of the base station, and registers the position in the host device such as an MME (Mobility Management Entity).

(Base Station Database)

Figure 6:
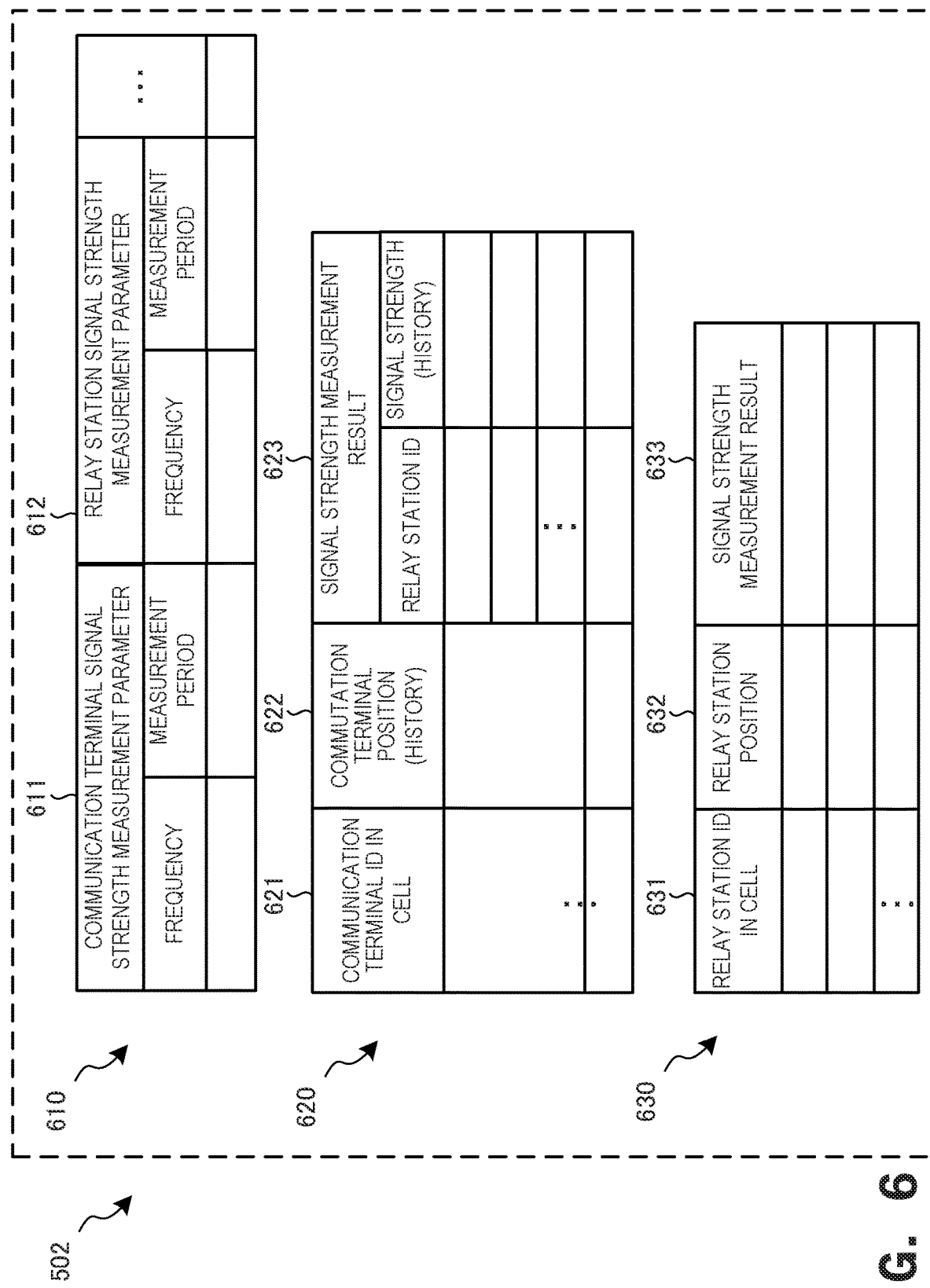
FIG. 6 is a view showing the arrangement of a base station database according to the second example embodiment of the present invention.

FIG. 6 is a view showing the arrangement of the base station database 502 according to this example embodiment. The base station database 502 stores data necessary for the operation of the communication processing apparatus 220 according to this example embodiment.

The base station database 502 includes a parameter storage portion 610 that stores parameters used to implement control according to this example embodiment for the communication terminal 210 and the relay station 230 in the cell, a communication terminal information storage portion 620 including the measurement result of the received signal strength of the communication terminal 210 in the cell controlled by the communication processing apparatus 220, and a relay station information storage portion 630 including the measurement result of the received signal strength of the relay station 230 in the cell controlled by the communication processing apparatus 220.

The parameter storage portion 610 stores a communication terminal signal strength measurement parameter 611 necessary for discovery processing in the communication terminal, and a relay station signal strength measurement parameter 612 necessary for discovery processing in the relay station. Each of the communication terminal signal strength measurement parameter 611 and the relay station signal strength measurement parameter 612 includes the frequency of a signal and a measurement period.

The communication terminal information storage portion 620 stores a commutation terminal position 622, and a signal strength measurement result 623 from each relay station in association with a communication terminal ID 621 located in the cell. The signal strength measurement result 623 stores a relay station ID and a signal strength in association with each other.

The relay station information storage portion 630 stores a relay station position 632, and a signal strength measurement result 633 from the base station in association with a relay station ID 631 located in the cell.

(Communication Path Setter)

Figure 7:
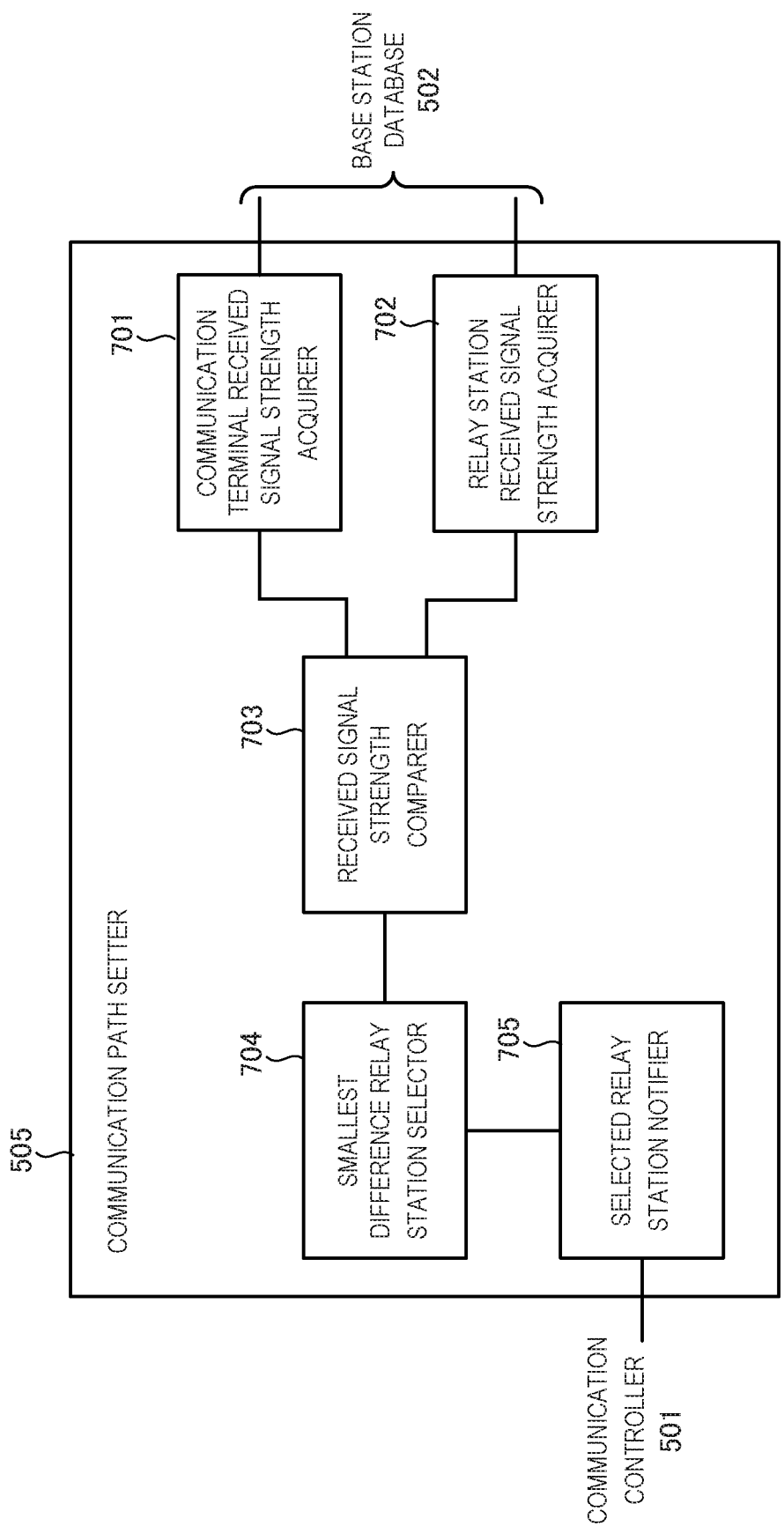
FIG. 7 is a block diagram showing the functional arrangement of a communication path setter according to the second example embodiment of the present invention.

FIG. 7 is a block diagram showing the functional arrangement of the communication path setter 505 according to this example embodiment.

The communication path setter 505 includes a communication terminal received signal strength acquirer 701, a relay station received signal strength acquirer 702, a received signal strength comparer 703, a smallest difference relay station selector 704, and a selected relay station notifier 705.

The communication terminal received signal strength acquirer 701 acquires a strength of received signal from a relay station, which is measured by each communication terminal and stored in the base station database 502. The relay station received signal strength acquirer 702 acquires a strength of received signal from a relay station, which is measured by each relay station and stored in the base station database 502. The received signal strength comparer 703 sequentially compares a communication terminal received signal strength and a relay station received signal strength according to a temporary communication path. The smallest difference relay station selector 704 selects a relay station for which the difference is minimum in the comparison results by the received signal strength comparer 703 as a connection destination for the communication terminal. The selected relay station notifier 705 notifies the communication terminal of the relay station selected by the smallest difference relay station selector 704 as the connection destination.

<<Functional Arrangement of Relay Station>>

FIG. 8 is a block diagram showing the functional arrangement of the relay station 230 (relay UE) according to this example embodiment. Note that FIG. 8 shows functional components associated with this example embodiment, and other functions provided in the relay station 230 are not illustrated.

The relay station 230 includes a communication controller 801, a relay station database 802, a relay processing parameter acquirer 803, a communication relay processor 804, a discovery processing controller 805, a received signal strength measurement processor 806, and a power supply (battery) 807.

The communication controller 801 controls communication between the relay station 230 and the base station 220 or the communication terminal 210. Note that although not illustrated in FIG. 8, the communication controller 801 may control communication with another relay station 230. Additionally, in FIG. 8, one communication controller 801 controls communication with both the base station 220 and the communication terminal 210. However, a base station communication controller and a communication terminal communication controller may separately be provided.

The relay station database 802 includes a discovery processing parameter 821 and stores data necessary for the operation of the relay station 230. The relay processing parameter acquirer 803 acquires parameters necessary for relay processing set from the base station 220, and stores them in the relay station database 802. The communication relay processor 804 relays the communication between the base station 220 and the communication terminal 210 using the relay processing parameters stored in the relay station database 802. The discovery processing controller 805 controls discovery processing for the connected communication terminal 210 using parameters stored in the discovery processing parameter 821 of the relay station database 802. The received signal strength measurement processor 806 measures the strength of received signal from the base station 220 and notifies the base station of it. The power supply (battery) 807 is a power supply used to operate the relay station 230.

<<Functional Arrangement of Communication Terminal>>

Figure 9:
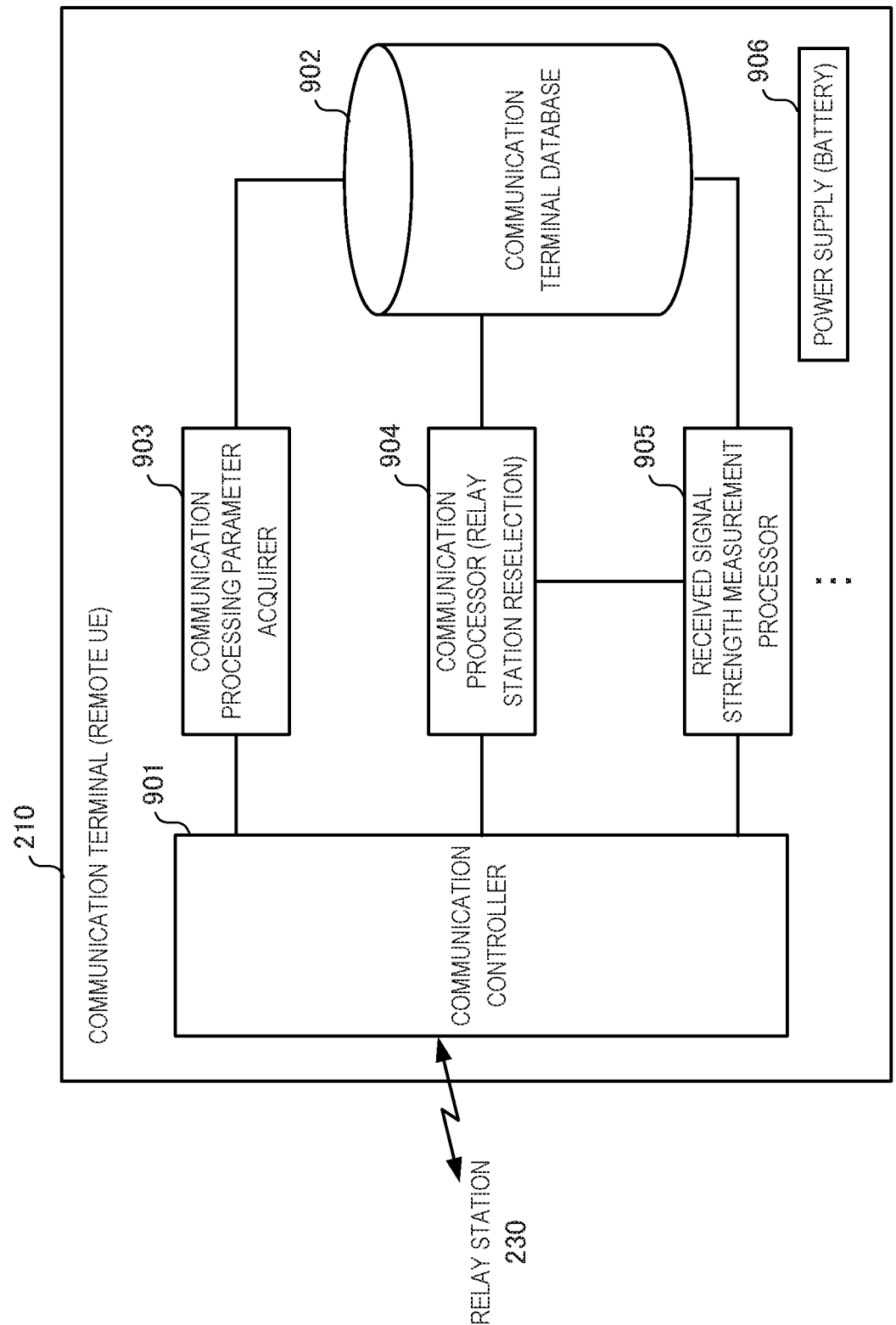
FIG. 9 is a block diagram showing the functional arrangement of a communication terminal (remote UE) according to the second example embodiment of the present invention.

FIG. 9 is a block diagram showing the functional arrangement of the communication terminal 210 (remote UE) according to this example embodiment. Note that FIG. 9 shows functional components associated with this example embodiment, and other functions provided in the communication terminal 210 are not illustrated.

The communication terminal 210 includes a communication controller 901, a communication terminal database 902, a communication processing parameter acquirer 903, a communication processor 904, a received signal strength measurement processor 905, and a power supply (battery) 906.

The communication controller 901 controls communication between the communication terminal 210 and the relay station 230. Note that although not illustrated in FIG. 9, the communication controller 901 may control communication with the base station 220 or another communication terminal 210.

The communication terminal database 902 stores data necessary for the operation of the communication terminal 210. The communication processing parameter acquirer 903 acquires parameters necessary for communication processing set from the base station 220, and stores them in the communication terminal database 902. The communication processor 904 processes communication with the base station 220 via the relay station 230 using the communication processing parameters stored in the communication terminal database 902. Note that the communication processor 904 also performs reselection processing of a relay station based on the measurement result of the received signal strength. The received signal strength measurement processor 905 measures the strength of received signal transmitted from the relay station 230 using the parameters stored in the communication terminal database 902, and notifies the base station of the result via the relay station. The power supply (battery) 906 is the power supply for the communication terminal 210.

<<Hardware Arrangement of Communication Processing Apparatus>>

Figure 10:
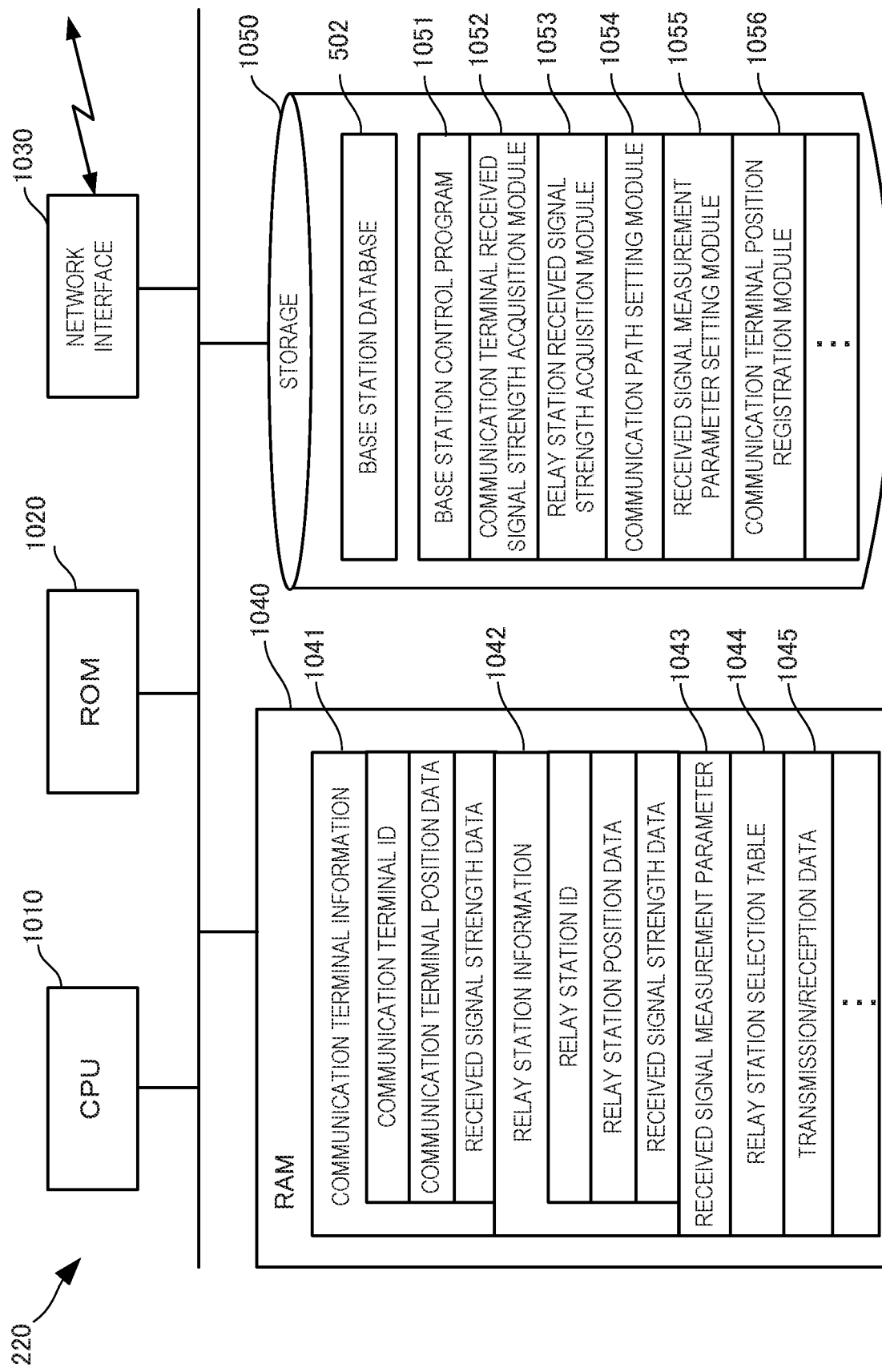
FIG. 10 is a block diagram showing the hardware arrangement of the communication processing apparatus (base station: eNB) according to the second example embodiment of the present invention.

FIG. 10 is a block diagram showing the hardware arrangement of the communication processing apparatus 220 (base station: eNB) according to this example embodiment.

In FIG. 10, a CPU (Central Processing Unit) 1010 is a processor for arithmetic control and executes a program, thereby implementing the functional components shown in FIG. 5. The CPU 1010 may include a plurality of processors and execute different programs, modules, tasks, threads, and the like in parallel. A ROM (Read Only Memory) 1020 stores initial data, the permanent data of programs, and the programs. A network interface 1030 controls communication with the relay station 230, the communication terminal 210, or another host device via a network.

A RAM (Random Access Memory) 1040 is a random access memory used by the CPU 1010 as a work area for temporary storage. In the RAM 1040, an area to store data necessary for implementation of this example embodiment is allocated. Communication terminal information 1041 is the information of a communication terminal located in the cell of the communication processing apparatus 220 serving as a base station. The communication terminal information 1041 includes communication terminal position data, received signal strength data, and the like in association with the communication terminal ID of each communication terminal. Relay station information 1042 is the information of a relay station located in the cell of the communication processing apparatus 220 serving as a base station. The relay station information 1042 includes relay station position data, received signal strength data, and the like in association with the relay station ID of each relay station. A received signal measurement parameter 1043 is a parameter used to measure the strength of received signal in the relay station 230 and the communication terminal 210. A relay station selection table 1044 is a table corresponding to the algorithm of relay station selection according to this example embodiment. Transmission/reception data 1045 is data transmitted/received to/from the relay station 230, the communication terminal 210, or another host device via the network interface 1030.

A storage 1050 stores databases, various kinds of parameters, and following data and programs necessary for implementation of this example embodiment. The base station database 502 is the database shown in FIG. 6. The storage 1050 stores the following programs. A base station control program 1051 is a program that controls information processing of the entire base station 220. A communication terminal received signal strength acquisition module 1052 is a module that acquires the strength of received signal measured by the communication terminal 210 from the communication terminal via a relay station, and accumulates the strength of received signal in the base station database 502. A relay station received signal strength acquisition module 1053 is a module that acquires the strength of received signal measured by the relay station 230 from the relay station, and accumulates the strength of received signal in the base station database 502. A communication path setting module 1054 is a module that selects the relay station 230 to be connected by referring to the communication history in the base station database 502, and sets the communication path between the base station and the communication terminal. A received signal measurement parameter setting module 1055 is a module configured to set parameters used to measure the strength of received signal at a predetermined period. A communication terminal position registration module 1056 is a module configured to register the position of a communication terminal located in the cell.

Note that programs and data concerning general-purpose functions or other implementable functions of the communication processing apparatus 220 are not illustrated in the RAM 1040 and the storage 1050 shown in FIG. 10.

<<Processing Procedure of Communication Processing Apparatus>>

Figure 11:
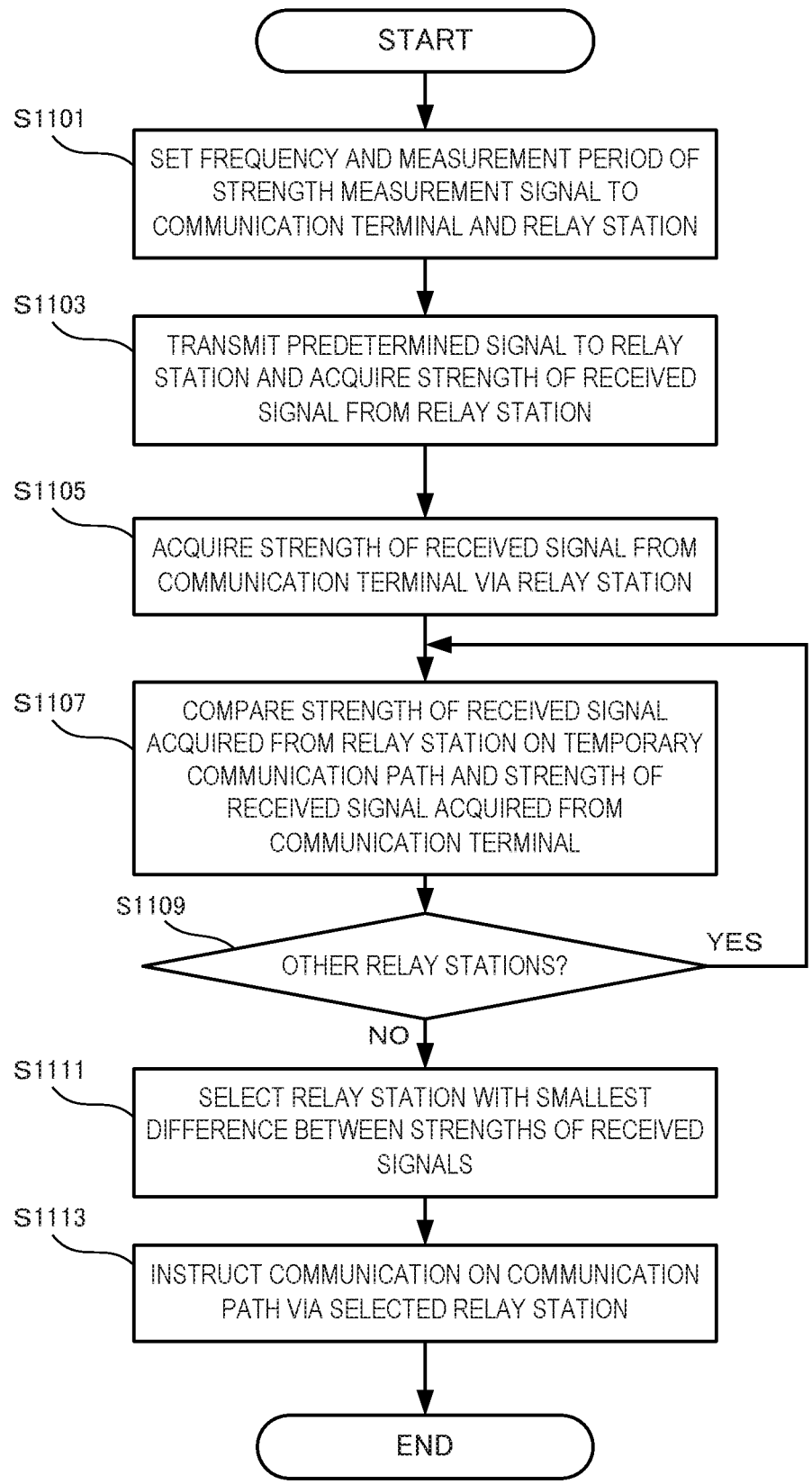
FIG. 11 is a flowchart showing the processing procedure of the communication processing apparatus (base station: eNB) according to the second example embodiment of the present invention.

FIG. 11 is a flowchart showing the processing procedure of the communication processing apparatus 220 (base station: eNB) according to this example embodiment. This flowchart is executed by the CPU 1010 shown in FIG. 10 using the RAM 1040 and implements the functional components shown in FIG. 5.

In step S1101, the communication processing apparatus 220 sets the frequency and the measurement period of the strength measurement signal to the communication terminal and the relay station. In step S1103, the communication processing apparatus 220 transmits a signal to each relay station, and acquires the strength of received signal measured by the relay station. In step S1105, the communication processing apparatus 220 acquires, via each relay station, the strength of received signal measured and transmitted by the communication terminal.

In step S1107, the communication processing apparatus 220 compares the strength of received signal obtained from each relay station on a temporary communication path and the strength of received signal obtained from the communication terminal, and stores the strength difference that is the comparison result. In step S1109, if other uncompared relay stations remain, the communication processing apparatus 220 repeats step S1107.

If other relay stations do not remain, in step S1111, the communication processing apparatus 220 selects the relay station with the smallest difference between the strengths of received signals. In step S1113, the communication processing apparatus 220 notifies the communication terminal of the selected relay station, and causes them to execute data communication processing on the communication path via the selected relay station.

According to this example embodiment, the relay station for which the difference between the strength of received signal from the relay station measured by the communication terminal and the strength of received signal from the base station measured by the relay station is small is selected. It is therefore possible to appropriately manage the total power consumption in the cell managed by the base station.

Third Example Embodiment

A communication processing system according to the third example embodiment of the present invention will be described next. The communication processing system according to this example embodiment is different from the second example embodiment in that a plurality of relay stations relay communication between a base station and a communication terminal. The rest of the components and operations is the same as in the second example embodiment. Hence, the same reference numerals denote the same components and operations, and a detailed description thereof will be omitted.

<<Outline of Arrangement of Communication Processing System>>

Figure 12:
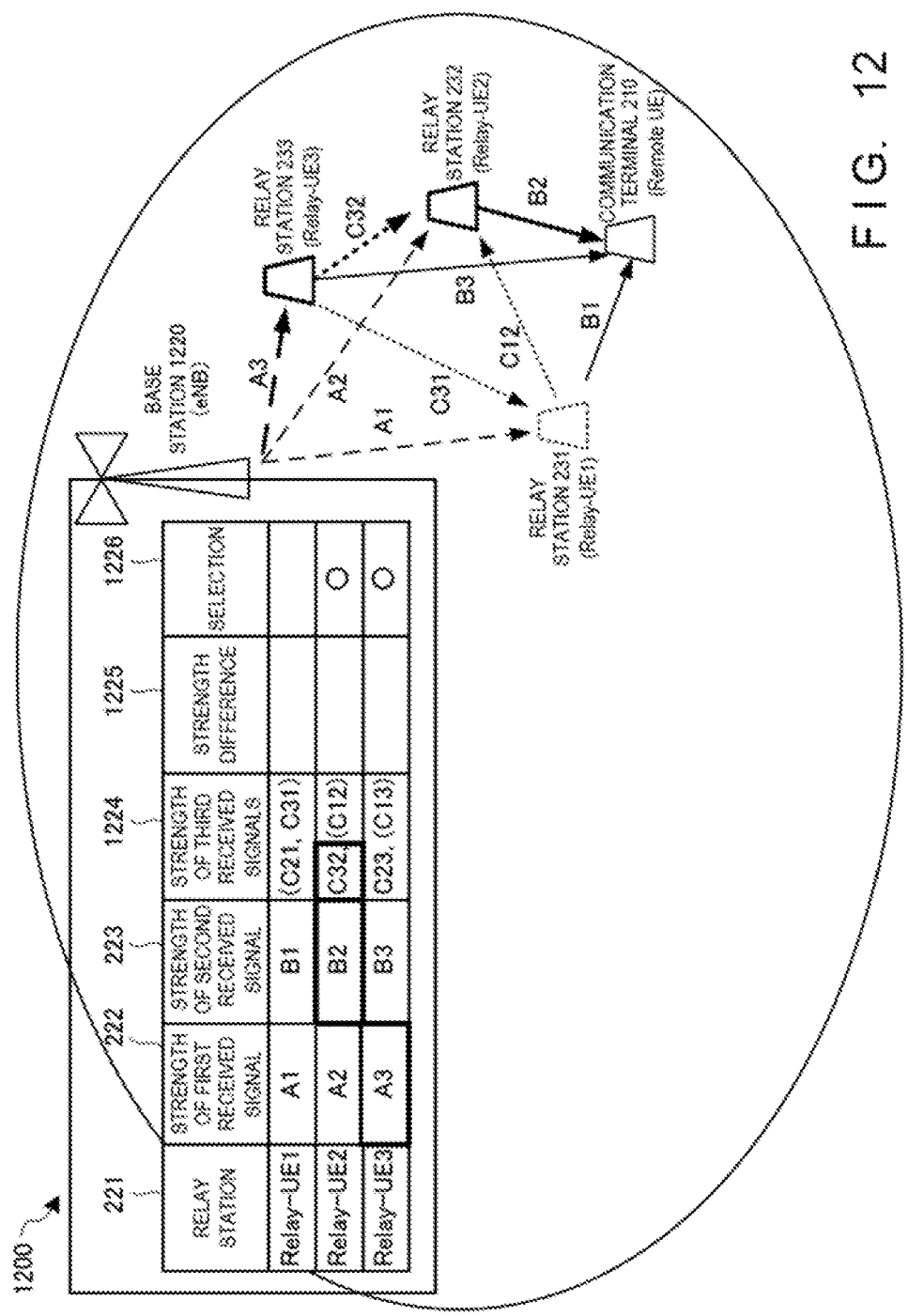
FIG. 12 is a view showing the arrangement of a communication processing system according to the third example embodiment of the present invention.

FIG. 12 is a view showing the arrangement of a communication processing system 1200 according to this example embodiment. Note that the same reference numerals as in FIG. 2 denote the same constituent elements in FIG. 12, and a repetitive description thereof will be omitted.

FIG. 12 shows the establishment of a communication path between a communication terminal 210 and a base station 1220 via relay stations 231 to 233 in a cell managed by the base station 1220. In FIG. 12, relay by a plurality of relay stations is also possible.

In FIG. 12, A1 to A3 are the measurement results of strengths of signals received from the base station 1220 measured in the relay stations 231 to 233. In addition, B1 to B3 are the measurement results of strengths of signals received from the relay stations 231 to 233 measured in the communication terminal 210. Furthermore, C32 is the measurement result of received signal strength from the relay station 233 in the relay station 232.

In the base station 1220, a strength of a first received signal 222 (A1 to A3), a strength of a second received signal 223 (B1 to B3), and strengths of third received signals 1224 (C12, C13, C23 C32, and the like) via communication channels between the relay stations 231-233 are collected, and a difference 1225 among the first, second and third signal strengths is obtained in association with a combination of relay stations 221. A combination of the relay station (Relay-UE3) and the relay station (Relay-UE2) of the smallest signal strength difference 1225 is selected as a combination of the relay stations that relay the base station 1220 and the communication terminal 210 (see 1226). When the relay station (Relay-UE3) and the relay station (Relay-UE2) are used, it is possible to suppress the power consumption of the communication terminal 210 and also suppress the power consumption of relay stations. This can optimize the total power consumption of the entire communication processing system 1200.

(Communication Path Setter)

Figure 13:
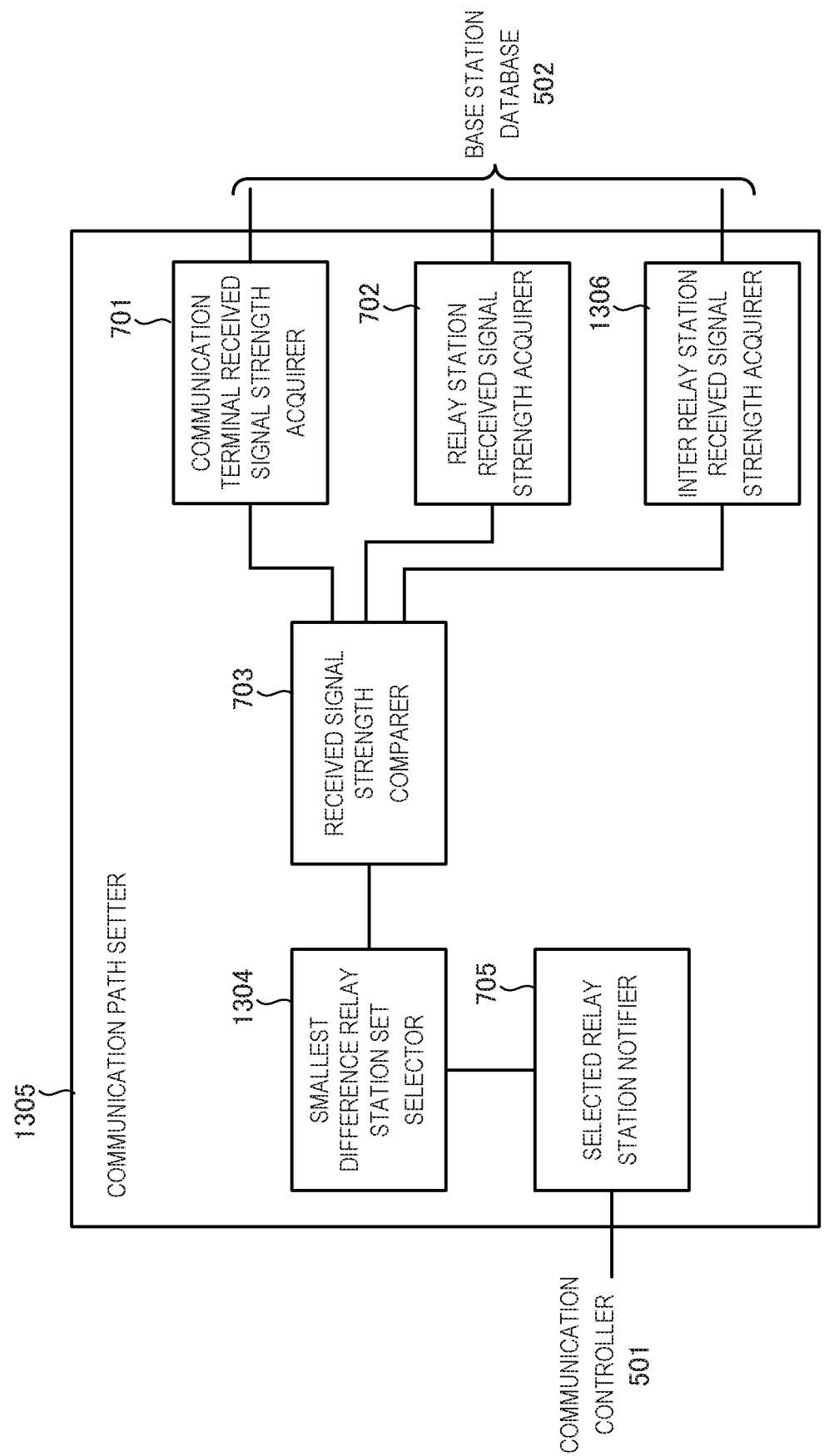
FIG. 13 is a block diagram showing the functional arrangement of a communication path setter according to the third example embodiment of the present invention.

FIG. 13 is a block diagram showing the functional arrangement of a communication path setter 1305 according to this example embodiment. Note that the same reference numerals as in FIG. 7 denote the same functional components in FIG. 13, and a repetitive description thereof will be omitted.

The communication path setter 1305 includes an inter relay station received signal strength acquirer 1306, and a smallest difference relay station set selector 1304. The inter relay station received signal strength acquirer 1306 acquires the strength of received signal measured between relay stations, which is stored in a base station database 502. The smallest difference relay station set selector 1304 selects relay by the set of a plurality of relay stations based on the comparison result of the received signal strengths by a received signal strength comparer 703.

<<Processing Procedure of Communication Processing Apparatus>>

Figure 14:
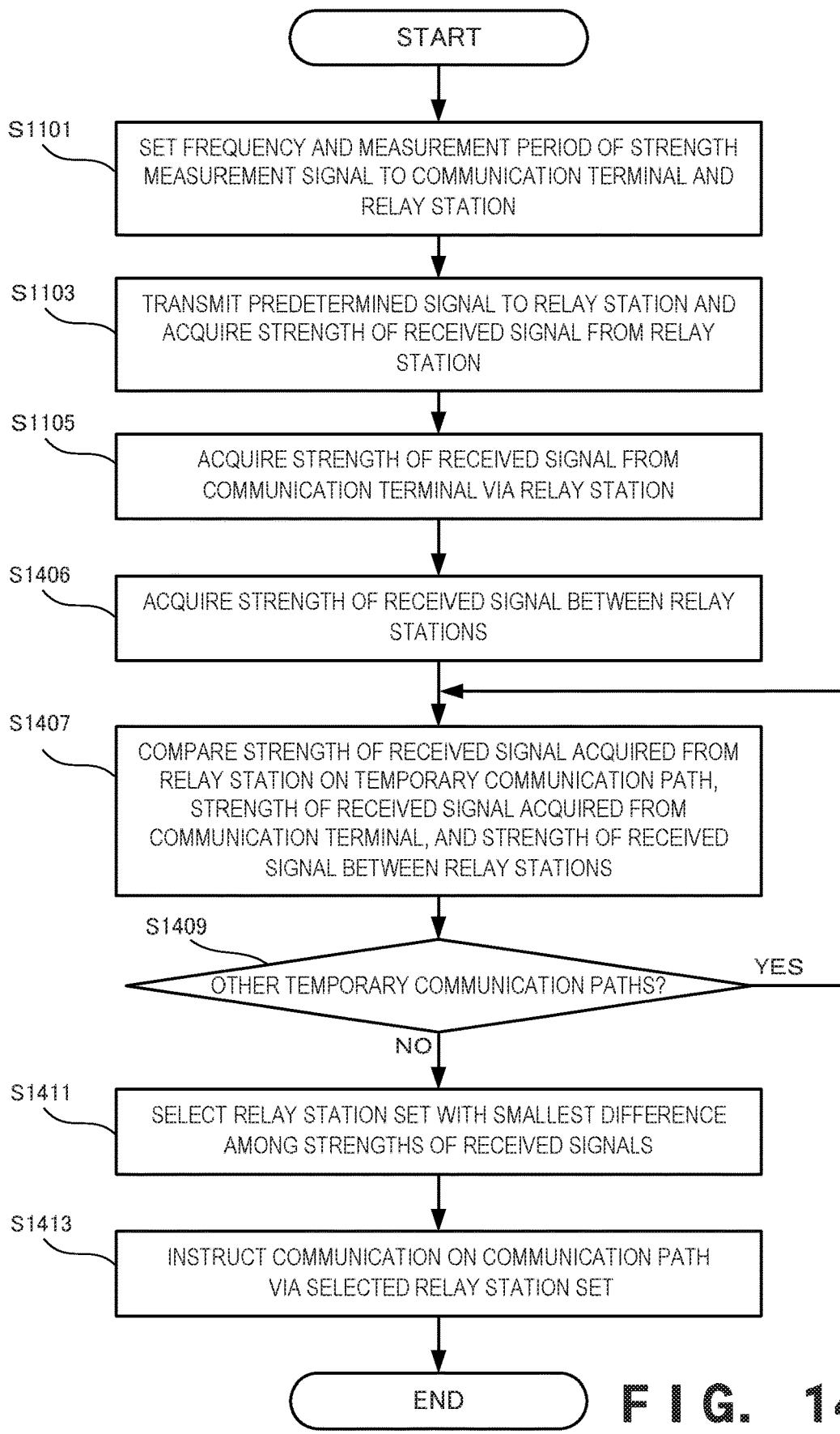
FIG. 14 is a flowchart showing the processing procedure of a communication processing apparatus (base station: eNB) according to the third example embodiment of the present invention.

FIG. 14 is a flowchart showing the processing procedure of the communication processing apparatus 1220 (base station: eNB) according to this example embodiment. Note that the same step numbers as in FIG. 11 denote the same steps in FIG. 14, and a repetitive description thereof will be omitted.

In step S1406, the communication processing apparatus 1220 acquires the strength of received signal transmitted from a relay station and measured by another relay station.

In step S1407, the communication processing apparatus 1220 compares the strength of received signal acquired from each relay station on a temporary communication path, the strength of received signal acquired from the communication terminal, and the strength of received signal between the relay stations, and stores the strength difference that is the comparison result. In step S1409, if other uncompared temporary communication paths remain, the communication processing apparatus 1220 repeats step S1407.

If other temporary communication paths do not remain, in step S1411, the communication processing apparatus 1220 selects the relay station set with the smallest difference between strengths of received signals. In step S1413, the communication processing apparatus 1220 notifies the communication terminal and the relay stations of the communication path of the selected relay station set, and causes them to execute data communication processing on the communication path via the selected relay station.

According to this example embodiment, the communication path including the plurality of relay stations is selected such that the difference between the measured received signal strengths becomes small. It is therefore possible to more appropriately manage the total power consumption in the cell managed by the base station.

Fourth Example Embodiment

A communication processing system according to the fourth example embodiment of the present invention will be described next. The communication processing system according to this example embodiment is different from the second example embodiment and the third example embodiment in that the power consumption of each communication functional element in a cell managed by a base station can totally be managed. The rest of the components and operations is the same as in the second example embodiment. Hence, the same reference numerals denote the same components and operations, and a detailed description thereof will be omitted.

<<Outline of Arrangement of Communication Processing System>>

FIG. 15 is a view showing the arrangement of a communication processing system 1500 according to this example embodiment. Note that the same reference numerals as in FIG. 2 denote the same constituent elements in FIG. 15, and a repetitive description thereof will be omitted.

FIG. 15 shows the establishment of a communication path between communication terminals 211 to 21*n* and a base station 1520 via relay stations 231 to 23*m* in a cell managed by the base station 1520. In FIG. 15, a stable communication processing system is implemented, in which relay between the base station and each of the communication terminals 211-21*n* is also possible by using a plurality of relay stations, and localization of power consumption at the used plurality of relay stations is eliminated not only in the individual communication paths between the base station and the communication terminals but also in the total communication paths in the cell.

In FIG. 15, A1 to A4 are the measurement results of strengths of signals received from the base station 1520 measured in the relay stations 231 to 234. In addition, B11 to B*mn* are the measurement results of strengths of signals received from the relay stations 231 to 23*m* measured in the communication terminals 211 to 21*n*. Furthermore, C41 to C4*m* are the measurement results of strengths of signals received from the relay station 234 measured in the relay station 231 to 23*m*.

In this example embodiment, in the base station 1520, an upper limit strength value 1521 and a lower limit strength value 1522 of the received signal are stored. A communication path that relays a relay station is selected such that all received signal strengths are included between the upper limit strength value 1521 and the lower limit strength value 1522. If the strength of received signal is more than the upper limit strength value 1521, it indicates that the two communication devices are too close, and the relay is wasteful. If the strength of received signal is less than the lower limit strength value 1522, it indicates that the two communication devices are too far, and the communication quality is unstable. The upper limit strength value 1521 and the lower limit strength value 1522 can thus be set.

(Communication Path Setter)

Figure 16:
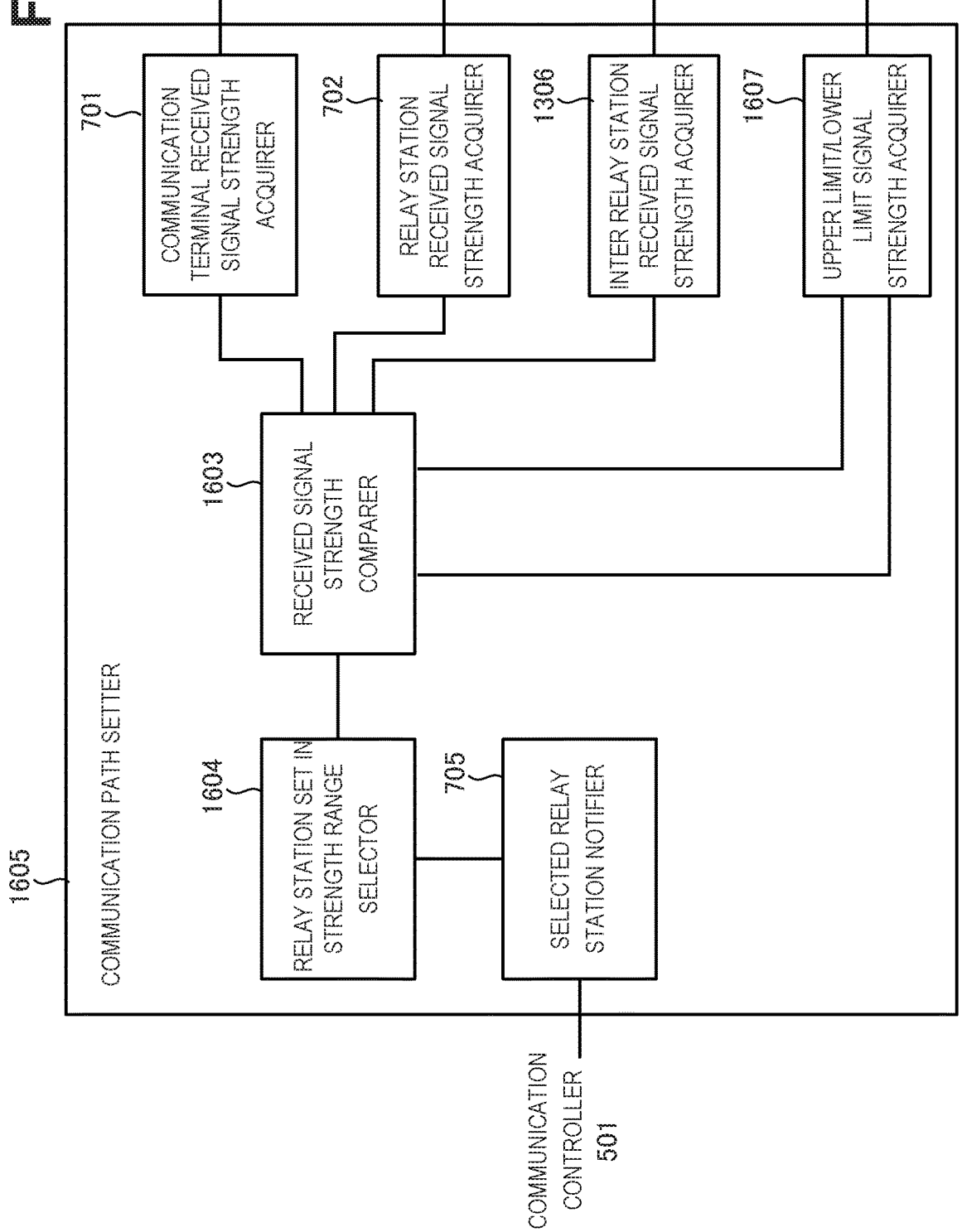
FIG. 16 is a block diagram showing the functional arrangement of a communication path setter according to the fourth example embodiment of the present invention.

FIG. 16 is a block diagram showing the functional arrangement of a communication path setter 1605 according to this example embodiment. Note that the same reference numerals as in FIG. 7 or 13 denote the same functional components in FIG. 16, and a repetitive description thereof will be omitted.

The communication path setter 1605 includes an upper limit/lower limit signal strength acquirer 1607, a received signal strength comparer 1603, and a relay station set in strength range selector 1604. The upper limit/lower limit signal strength acquirer 1607 acquires the upper limit strength value and the lower limit strength value of the strength of received signal from a base station database 502. The received signal strength comparer 1603 compares not the received signal strengths with each other but whether the received signal strength is located between the upper limit strength value and the lower limit strength value. Then, the relay station set in strength range selector 1604 notifies the communication terminal and the relay stations of selection of relay stations for which all received signal strengths are located between the upper limit strength value and the lower limit strength value.

<<Processing Procedure of Communication Processing Apparatus>>

Figure 17:
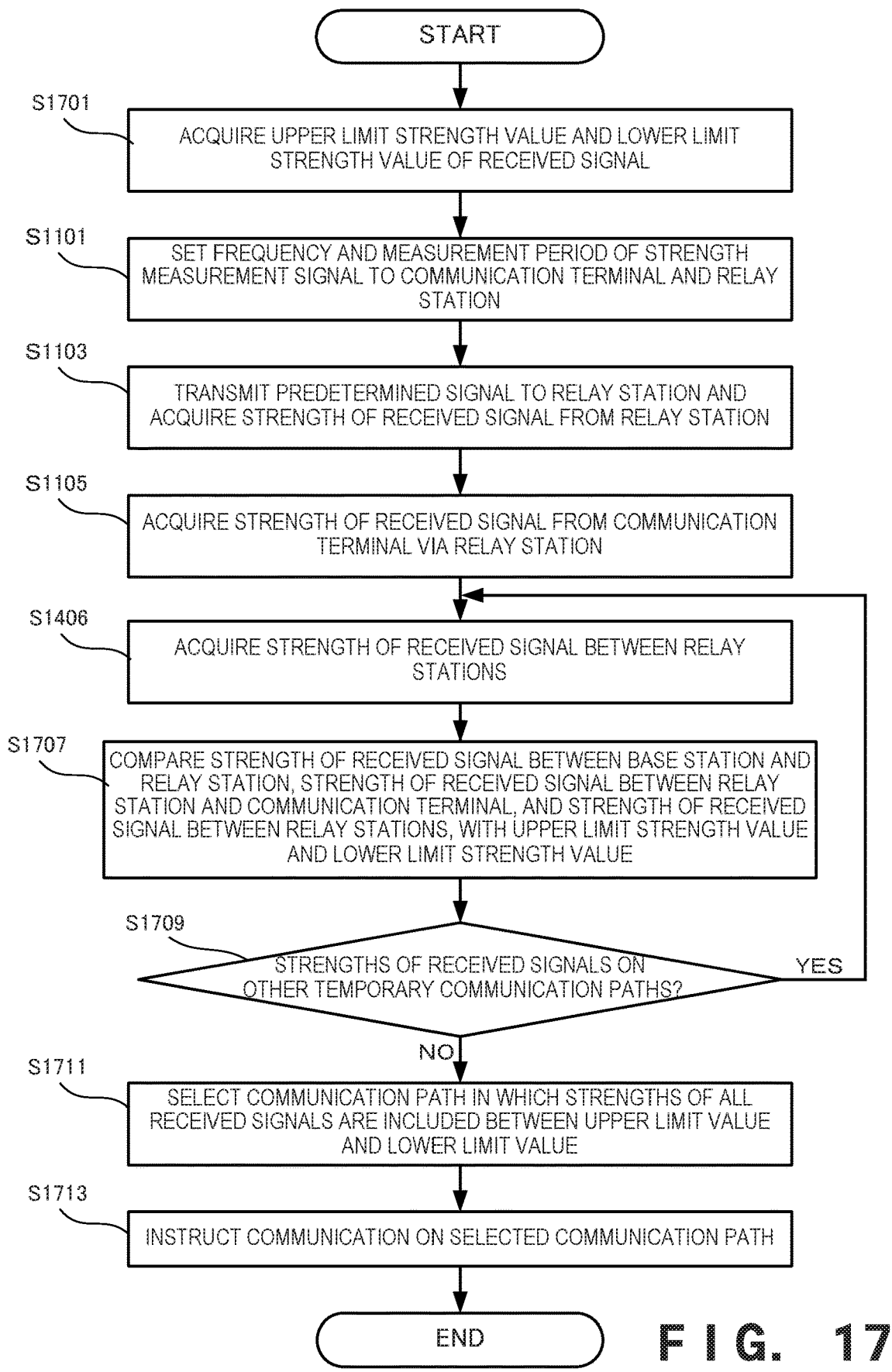
FIG. 17 is a flowchart showing the processing procedure of a communication processing apparatus (base station: eNB) according to the fourth example embodiment of the present invention.

FIG. 17 is a flowchart showing the processing procedure of the communication processing apparatus 1520 (base station: eNB) according to this example embodiment. Note that the same step numbers as in FIG. 11 or 14 denote the same steps in FIG. 17, and a repetitive description thereof will be omitted.

In step S1701, the communication processing apparatus 1520 acquires the upper limit strength value and the lower limit strength value of the received signal from the base station database 502.

In step S1707, the communication processing apparatus 1520 compares each of the strengths of received signals between the base station and the relay stations, the strengths of received signals between the relay stations and the communication terminals, and the strength of received signals between the relay stations, with the upper limit strength value and the lower limit strength value, and stores the comparison results. In step S1709, if the strengths of received signals other uncompared temporary communication paths remain, the communication processing apparatus 1520 repeats step S1707.

If the received signal strength of another temporary communication path does not remain, in step S1711, the communication processing apparatus 1520 selects a communication path such that the strengths of all received signals are included between the upper limit strength value and the lower limit strength value. In step S1713, the communication processing apparatus 1520 notifies the communication terminals and the relay stations of the communication path of the selected relay station set, and causes them to execute data communication processing on the communication path via the selected relay station set.

According to this example embodiment, a communication path including all communication functional elements is selected such that the measured received signal strengths are included between the upper limit strength value and the lower limit strength value. It is therefore possible to more appropriately manage the total power consumption in the cell managed by the base station.

Fifth Example Embodiment

A communication processing system according to the fifth example embodiment of the present invention will be described next. The communication processing system according to this example embodiment is different from the second to fourth example embodiments in that a communication path is selected in consideration of the limitations of relay stations. The rest of the components and operations is the same as in the second example embodiment. Hence, the same reference numerals denote the same components and operations, and a detailed description thereof will be omitted.

(Communication Path Setter)

Figure 18:
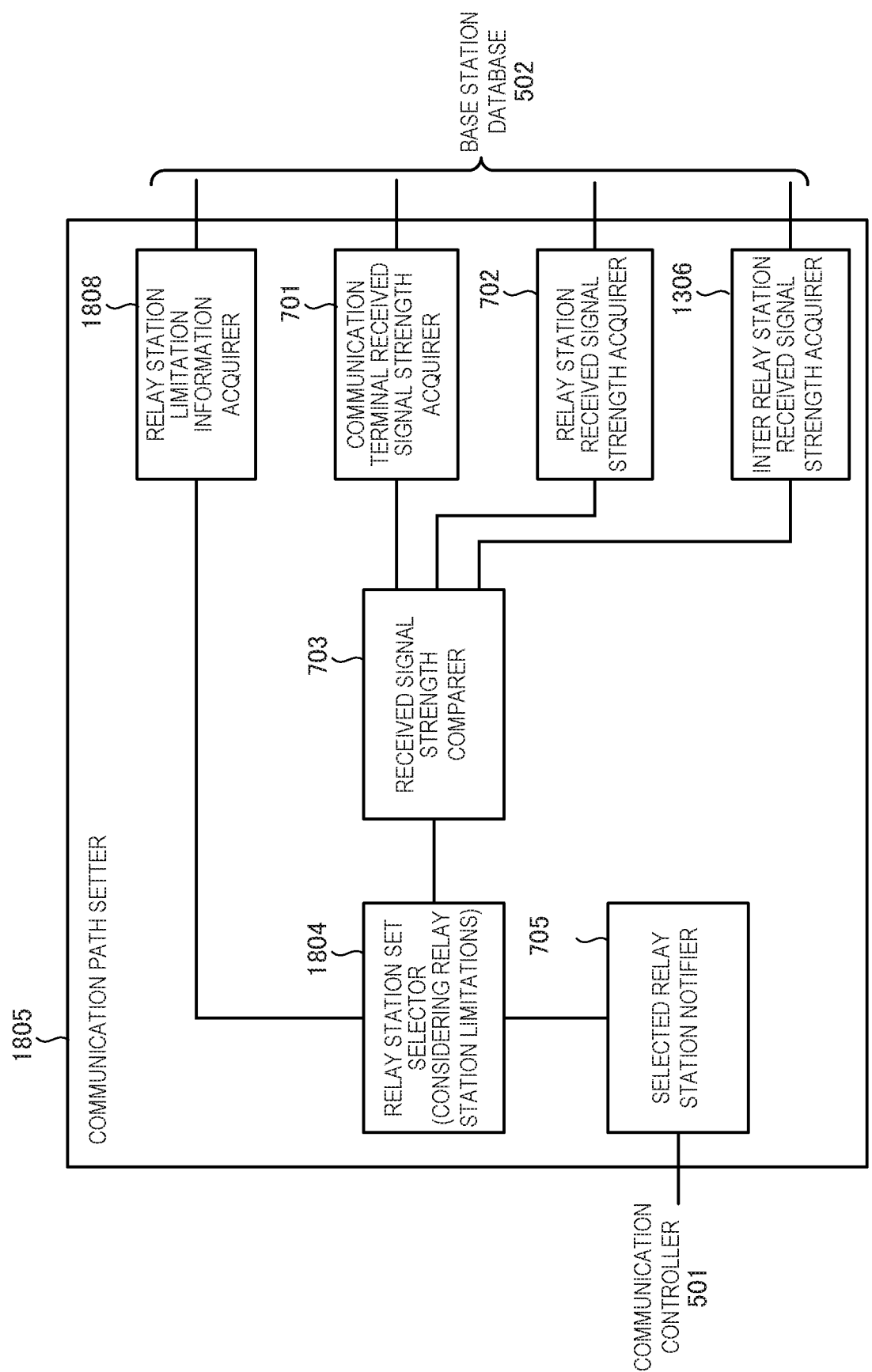
FIG. 18 is a block diagram showing the functional arrangement of a communication path setter according to the fifth example embodiment of the present invention.

FIG. 18 is a block diagram showing the functional arrangement of a communication path setter 1805 according to this example embodiment. Note that the same reference numerals as in FIG. 7 or 13 denote the same functional components in FIG. 18, and a repetitive description thereof will be omitted.

The communication path setter 1805 includes a relay station limitation information acquirer 1808, and a relay station set selector 1804 (considering relay station limitations). The relay station limitation information acquirer 1808 acquires relay station limitation information from a base station database 502. The relay station set selector 1804 selects a relay station set in consideration of the relay station limitation information.

(Relay Station Limitation Information)

FIG. 19 is a view showing relay station limitation information 1926 according to this example embodiment. Note that the same reference numerals as in the relay station selection table shown in FIG. 2 or 12 denote the same functional elements in FIG. 19, and a repetitive description thereof will be omitted.

The relay station limitation information 1926 includes, for example, the number of communications (the number of channels) that each relay station can relay, the number of communications (the number of channels) currently in use, the remaining battery level, and the like. The power consumption can more stably be managed by combining these pieces of limitation information with relay station selection based on the strength of received signal. Note that these pieces of limitation information may be taken into consideration with priority in relay station selection. For example, the remaining battery level is the limitation of the highest priority to avoid selection.

According to this example embodiment, a relay station is selected in consideration of the limitations of the relay stations. It is therefore possible to hold the communication quality and appropriately manage the total power consumption in the cell managed by the base station.

Other Example Embodiments

While the invention has been particularly shown and described with reference to example embodiments thereof, the invention is not limited to these example embodiments. It will be understood by those of ordinary skill in the art that various changes in form and details may be made therein without departing from the spirit and scope of the present invention as defined by the claims.

The present invention is applicable to a system including a plurality of devices or a single apparatus. The present invention is also applicable even when an information processing program for implementing the functions of example embodiments is supplied to the system or apparatus directly or from a remote site. Hence, the present invention also incorporates the program installed in a computer to implement the functions of the present invention by the computer, a medium storing the program, and a WWW (World Wide Web) server that causes a user to download the program. Especially, the present invention incorporates at least a non-transitory computer readable medium storing a program that causes a computer to execute processing steps included in the above-described example embodiments.

The invention claimed is:

1. A communication processing method of a communication processing system including a communication terminal, a base station, and a plurality of relay stations that relay communication between the communication terminal and the base station, comprising:

measuring, in the plurality of relay stations, strengths of first signals received from the base station;

measuring, in the communication terminal, strengths of second signals received from the plurality of relay stations; and comparing the strengths of the first signals and the strengths of the second signals, and selecting a communication path with a smallest difference between strengths of a first signal and a second signal in a plurality of communication paths on which the base station, the plurality of relay stations and the communication terminal are connected.

2. A communication processing apparatus comprising:
a first receiver that receives, from a plurality of relay stations that relay communication between a communication terminal and a base station, strengths of first signals which are measured, in the plurality of relay stations, based on the first signals received from the base station;
a second receiver that receives, from the communication terminal, strengths of second signals which are measured, in the communication terminal, based on the second signals received from the plurality of relay stations; and
a selector that compares the strengths of the first signals and the strengths of the second signals, and selects a communication path with a smallest difference between strengths of a first signal and a second signal in a plurality of communication paths on which the base station, the plurality of relay stations and the communication terminal are connected.

3. The communication processing apparatus according to claim 2, further comprising a third receiver that receives, from the plurality of relay stations, strengths of third signals which are measured, in the plurality of relay stations, based on the third signals via communication channels transmitted from one relay station and received by another relay station in the plurality of relay stations, and
the selector compares the strengths of the first signals, the strengths of the second signals and the strengths of the third signals, and selects a communication path with a smallest difference among strengths of a first signal, a second signal and a third signal in the plurality of communication paths on which the base station, the plurality of relay stations and the communication terminal are connected.

4. The communication processing apparatus according to claim 3, wherein the selector selects a communication path on which the base station and the communication terminal are connected in consideration of a limitation of use of each of the relay stations.

5. The communication processing apparatus according to claim 2, wherein the selector compares strengths of received signals corresponding to a plurality of communication paths between the base station, the plurality of relay stations and a plurality of communication terminals with each other, and selects a communication path with a smallest difference among the strengths of the received signals for each of the communication terminals.

6. The communication processing apparatus according to claim 5, wherein the selector selects a communication path on which the base station and the communication terminal are connected in consideration of a limitation of use of each of the relay stations.

7. The communication processing apparatus according to claim 2, wherein the selector selects a communication path on which the base station and the communication terminal are connected in consideration of a limitation of use of each of the relay stations.

8. The communication processing apparatus according to claim 2, wherein the communication terminal comprises a Remote UE (User Equipment) in 3GPP TS 23.303 V14.1.0, the base station comprises an eNB (evolved Node B), the relay station comprises a ProSe UE-to-NW (Network) Relay, and the measurement of the received signal strength by the measurer is included in a Discovery Procedure.

9. The communication processing apparatus according to claim 2, wherein the communication terminal comprises an IoT (Internet of Things) device, an MTC (Machine Type Communication) device, and an M2M Machine to Machine) device.

10. A non-transitory computer-readable storage medium storing a communication processing apparatus control program for causing a computer to execute a method, comprising:
receiving, from a plurality of relay stations that relay communication between a communication terminal and a base station, strengths of first signals which are measured, in the plurality of relay stations, based on the first signals received from the base station;
receiving, from the communication terminal, strengths of second signals which are measured, in the communication terminal, based on the second signals received from the plurality of relay stations; and
comparing the strengths of the first signals and the strengths of the second signals, and selecting a communication path with a smallest difference between strengths of a first signal and a second signal in a plurality of communication paths on which the base station, the plurality of relay stations and the communication terminal are connected.

* * * * *